US009531637B2

(12) United States Patent
Sharp

(10) Patent No.: US 9,531,637 B2
(45) Date of Patent: Dec. 27, 2016

(54) SYSTEM, APPARATUS, AND METHODS FOR SERVER AND COMPUTER INTERACTION VIA WEB COOKIES

(71) Applicant: Ingersoll-Rand Company, Davidson, NC (US)

(72) Inventor: Daniel R. Sharp, Golden, CO (US)

(73) Assignee: INGERSOLL-RAND COMPANY, Davidson, NC (US)

(*) Notice: Subject to any disclaimer, the term of this patent is extended or adjusted under 35 U.S.C. 154(b) by 370 days.

(21) Appl. No.: 14/075,938

(22) Filed: Nov. 8, 2013

(65) Prior Publication Data

US 2014/0129712 A1 May 8, 2014

Related U.S. Application Data

(60) Provisional application No. 61/724,153, filed on Nov. 8, 2012.

(51) Int. Cl.
| | |
|---|---|
| G06F 15/173 | (2006.01) |
| H04L 12/911 | (2013.01) |
| G06F 21/31 | (2013.01) |
| G07C 9/00 | (2006.01) |

(52) U.S. Cl.
CPC .............. *H04L 47/70* (2013.01); *G06F 21/31* (2013.01); *G07C 9/00571* (2013.01); *G07C 9/00904* (2013.01)

(58) Field of Classification Search
CPC ...... H04L 47/70; G06F 21/31; G07C 9/00571; G07C 9/00904
See application file for complete search history.

(56) References Cited

U.S. PATENT DOCUMENTS

| | | | |
|---|---|---|---|
| 5,768,510 | A | 6/1998 | Gish |
| 5,848,246 | A | 12/1998 | Gish |
| 5,987,245 | A | 11/1999 | Gish |
| 6,038,590 | A | 3/2000 | Gish |
| 6,052,711 | A | 4/2000 | Gish |
| 6,233,620 | B1 | 5/2001 | Gish |
| 6,253,282 | B1 | 6/2001 | Gish |
| 6,266,709 | B1 | 7/2001 | Gish |
| 6,272,555 | B1 | 8/2001 | Gish |
| 6,272,556 | B1 | 8/2001 | Gish |
| 6,304,893 | B1 | 10/2001 | Gish |
| 6,424,991 | B1 | 7/2002 | Gish |
| 6,434,598 | B1 | 8/2002 | Gish |
| 7,111,037 | B1 | 9/2006 | Chesley et al. |

(Continued)

OTHER PUBLICATIONS

International Search Report and Written Opinion from the International Search Authority, International Application No. PCT/US13/69307, May 7, 2014, 8 pages.

(Continued)

*Primary Examiner* — Moustafa M Meky
*Assistant Examiner* — Andrea Hurst
(74) *Attorney, Agent, or Firm* — Taft Stettinius & Hollister LLP

(57) ABSTRACT

A computer and a server may communicate via a web cookies such as local shared objects. The computer may detect the presence of one local shared object and generate a second local shared object based on the first local shared object. The computer may perform an action based on the second local shared object.

10 Claims, 17 Drawing Sheets

(56) References Cited

U.S. PATENT DOCUMENTS

| | | |
|---|---|---|
| 7,287,256 B1 | 10/2007 | Lozben et al. |
| 7,529,682 B2 | 5/2009 | Geller et al. |
| 7,716,489 B1 | 5/2010 | Brandt et al. |
| 7,802,293 B2 | 9/2010 | Boyer et al. |
| 7,809,798 B2 | 10/2010 | Chesley et al. |
| 7,836,018 B2 | 11/2010 | Oliveira et al. |
| 7,945,615 B1 | 5/2011 | Shetty et al. |
| 7,945,916 B1 | 5/2011 | Lozben et al. |
| 7,953,794 B2 | 5/2011 | Clarke et al. |
| 8,099,766 B1 | 1/2012 | Corbett |
| 8,112,492 B2 | 2/2012 | Chesley et al. |
| 8,131,558 B2 | 3/2012 | Geller et al. |
| 8,150,919 B2 | 4/2012 | Clarke et al. |
| 8,176,163 B1* | 5/2012 | Fikes ................ G06F 21/6263 709/219 |
| 8,214,887 B2 | 7/2012 | Clark et al. |
| 8,332,498 B2 | 12/2012 | Robinton et al. |
| 8,341,114 B2 | 12/2012 | Mast et al. |
| 2003/0140121 A1 | 7/2003 | Adams |
| 2006/0026264 A1 | 2/2006 | Chesley et al. |
| 2006/0282660 A1* | 12/2006 | Varghese ................ G06F 21/31 713/155 |
| 2008/0055306 A1* | 3/2008 | Kwok ................... G06Q 10/10 345/419 |
| 2009/0037995 A1 | 2/2009 | Zapata et al. |
| 2009/0070228 A1* | 3/2009 | Ronen ................ G06Q 30/0603 705/26.1 |
| 2009/0089869 A1* | 4/2009 | Varghese ................ G06F 21/31 726/7 |
| 2009/0119160 A1* | 5/2009 | Woda ..................... G06Q 30/02 705/14.1 |
| 2009/0119161 A1* | 5/2009 | Woda ..................... G06Q 10/00 705/7.29 |
| 2010/0100836 A1 | 4/2010 | Corella et al. |
| 2011/0029420 A1* | 2/2011 | Bianco ................. G06Q 40/125 705/32 |
| 2011/0078776 A1 | 3/2011 | Boyer et al. |
| 2011/0185016 A1* | 7/2011 | Kandasamy ........... G06Q 30/02 709/203 |
| 2011/0196725 A1* | 8/2011 | Malcolmson ...... G06Q 30/0214 705/14.16 |
| 2011/0214163 A1 | 9/2011 | Smith et al. |
| 2012/0209987 A1* | 8/2012 | Rhinelander .......... G06Q 30/02 709/224 |
| 2012/0215624 A1 | 8/2012 | Ramer et al. |
| 2012/0215896 A1* | 8/2012 | Johannsen .............. G06F 21/44 709/223 |
| 2012/0317620 A1* | 12/2012 | Fefelov .................. G06Q 30/02 726/4 |
| 2013/0014136 A1* | 1/2013 | Bhatia .................. H04N 21/252 725/9 |
| 2013/0030989 A1 | 1/2013 | Geller et al. |
| 2013/0139238 A1* | 5/2013 | Ryan ..................... G06F 21/36 726/7 |
| 2013/0166627 A1 | 6/2013 | Villegas et al. |
| 2013/0212654 A1* | 8/2013 | Dorfman ............... H04L 67/02 726/5 |
| 2013/0268357 A1* | 10/2013 | Heath ..................... H04L 63/00 705/14.53 |
| 2015/0066719 A1* | 3/2015 | Agrawal ................ G06Q 40/02 705/35 |

OTHER PUBLICATIONS

Office Action, U.S. Appl. No. 14/075,884, Oct. 22, 2015.

* cited by examiner

SYSTEM, APPARATUS, AND METHODS FOR SERVER AND COMPUTER INTERACTION VIA WEB COOKIES

CROSS-REFERENCE TO RELATED APPLICATIONS

The present application claims the benefit of U.S. Provisional Patent Application No. 61/724,153, filed on Nov. 8, 2012, which is hereby incorporated by reference in its entirety.

BACKGROUND

The present application generally relates to server and computer communication, and in particular relates to server and computer communication in access control systems. Access control systems generally restrict access to certain areas, allowing certain persons access to said areas based on a credential. Some access control systems have certain limitations. Therefore, a need remains for further improvements in systems and methods for server and computer communication in access control systems.

SUMMARY

One embodiment is a unique system and method to server and computer communications. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DESCRIPTION OF ILLUSTRATIVE EMBODIMENTS

Figure 1:
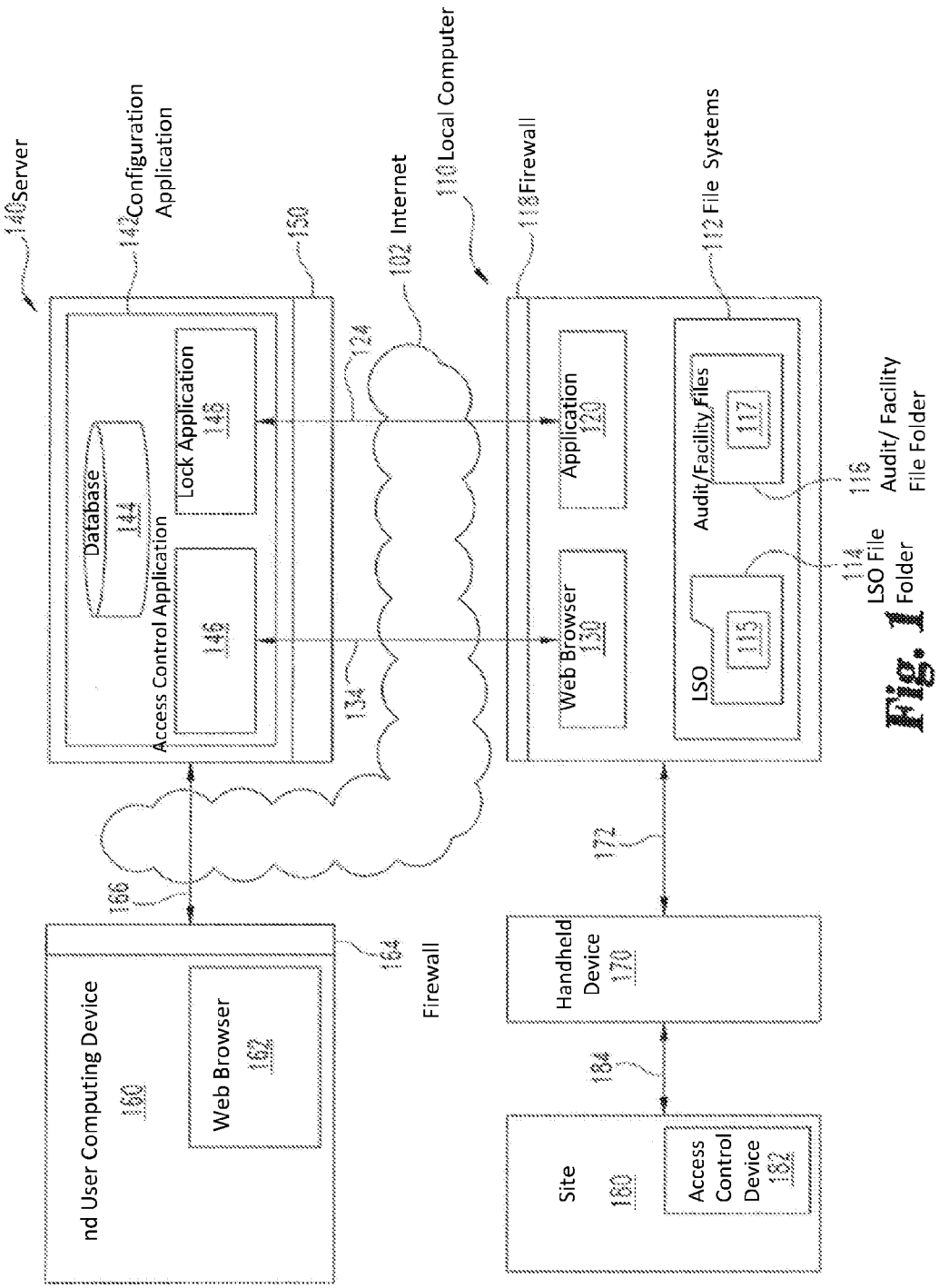
FIG. 1 is a block diagram of an exemplary server and computer interaction system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic block diagram of a system 100. The system 100 may be part of an access control system, and in particular, a multi-family access control system such as an apartment building, condominium building, hotel, etc. It is contemplated that the system 100 may be part of another type of system such as payment, vending, transit, and/or any other type of system that utilizes a credential or unique identifier.

The system 100 includes a server 140 and a local computer 110, such as a personal computer, tablet, or smartphone, for example. A configuration application 142 is generally installed on the server 140 and configured with non-transitory computer executable instructions to perform various operations, such as receiving web requests and transmitting web responses through communication channels 134, 124 via the Internet 102. In certain embodiments, the configuration application 142 may be configured as a web page, a web application, a cloud application, a web portal, or a combination thereof that is capable of providing web communication between the server 140 and local computer 110.

The server 140 may also include a database 144 to store information related to assets, such as door locks (e.g., an electronic lock), readers, and/or any other type of access control devices 182 in the system 100. The database 144 may store information such as credentials, locations of assets (e.g., door locks, readers, and/or other access control devices), user lists, audit data, and/or any other information for the access control system, for example. The server may further include an access control configuration management application 146 and a lock configuration management application 148, which may be configured with non-transitory computer executable instructions to communicate with the web browser 130 and/or computer application 120 on the local computer 110 using the web requests and responses.

The web requests and responses transmitted and received through communication channels 124, 134 are generally not user initiated requests, but are instead web requests generated by another program, or programs, on the local computer 110. For example, web requests and responses through communication channel 124 may be generated by a computer application 120. The computer application 120 may be an application that runs as a background service, for example, a Windows background service, but other applications on other operating systems are contemplated. In another example, web requests and responses through communication channel 134 may be generated by a web browser 130. Web browser 130 may be any software application capable of sending, receiving, and/or processing web communications such as Internet Explorer, Firefox, Chrome, and/or any other suitable web browser or HTTP-based communication application or service. The configuration application 142 may also send web commands or requests to the local computer 110 through communication channels 124 and 134 via the Internet 102, for example. The server 140 and the local computer 110 may communicate through communication channels 124 and 134 over any appropriate network such as the Internet 102.

The local computer 110 includes the web browser 130 and the computer application 120, each configured to read and write one or more web cookie files, such as Local Shared Objects (LSOs) 115, stored on the local computer 110 that reflect state, commands, and/or data from the local computer 110 and/or web browser 130. The web browser 130 presents a graphical user interface to the user and allows the user to interact with the configuration application 142, such as a Nexia Property Intelligence ("NPI") cloud application, running on the server 140. In certain embodiments, the LSOs 115 are Adobe Flash LSOs. It is contemplated that web cookies or other files of a type other than Adobe Flash LSOs 115 may be used in the present application.

The computer application 120 may be configured with non-transitory computer executable instructions to read and write status LSOs 115 and carry out operations based on the content and/or file name of the LSOs 115. The web browser 130 may be configured with a plug-in, such as Adobe Flash, for example, with non-transitory computer executable instructions to write command LSOs 115 in a file format for the computer application 120, configured to read and write the LSOs 115, to carry out. The LSOs 115 may be stored anywhere on the local computer 110 such as in the LSO file folder 114 in the local computer's 110 file system 112. The web browser 130, for example, may serve as the user interface for an end user on the local computer 110 to configure the access control system without having to directly access the configuration application 142 on server 140. Server 140 and local computer 110 may be protected from malicious software on the Internet 102 by firewalls 150 and 118, respectively.

The web browser 130 and computer application 120 each may be further configured to read and write one or more audit and/or facility files 117 that contain information about external assets 182, such as lock credentials, lock usage, and lock locations in the access control system, for example. The one or more audit and/or facility files 117 may be stored anywhere on the local computer 110 such as in the audit/facility file folder 116 in the local computer's 110 file system 112.

In the illustrated embodiment in FIG. 1, web requests and responses are transmitted and received between the access control configuration management application 146 on the server 140 and the web browser 130 on the local computer 110 through communication channel 134. Further illustrated in the embodiment in FIG. 1, web requests and responses are transmitted and received between the lock configuration management application 148 on the server 140 and the computer application 130 on the local computer 110 through communication channel 124. The server 140 and computer 110 may use a nonce (not shown), which is a unique, one-time-use authentication and authorization token or code to verify a computer with the server in order to allow communication between the server 140 and the computer 110.

The system 100 includes a site 180, which includes a facility or a collection of access control devices 182 such as electronic door locks, readers and/or other access control devices. The site 180 may be at the same location as the computer 110 or may be at a different location. The access control devices 182 may communicate with the local computer 110 using a handheld device 170, such as a personal digital assistant, tablet, or smartphone, for example, to transfer data between the local computer 110 and the access control devices 182 to receive commands for performing various operations such as programming access control devices, programming credentials, acquiring status of an access control device. The handheld device 170 may be connected to the local computer 110 via communication channel 172 in the form of a physical connection, such as USB, HDMI, FireWire, CAT 5, or any other type of wired data transfer connection method. It is contemplated that communication channel 172 may be a wireless data transfer method, such as Wi-Fi or Bluetooth, for example. Moreover, the local computer 110 and/or handheld device 170 may provide the access control system 100 functionality to manage the access control devices 182.

It is contemplated in some embodiments, one or more of the access control devices 182 may communicate with the server 140 and/or the local computer 110 over any network including the Internet 102 to receive commands for performing various operations such as programming access control devices, programming credentials, acquiring status of an access control device.

In certain embodiments, the web browser 130 reads and writes LSO files 115 to control actions by the computer application 120, including controlling hardware for the access control system. The present application allows computer activity to occur with user interface responses in the web browser 130 as if the computer hardware was part of the browser 130 by utilizing one or more communication channels (e.g., 124 and 134) between the configuration application 142 on server 140 and the web browser 130 on the local computer 110 via LSOs 115 stored in the LSO file folder 114. The computer application 120 uses LSOs 115 to represent state and activity on the computer 110 and the web browser 130 uses LSOs 115 to direct the computer 110 to perform a particular action or report a particular status.

Plug-ins and/or embedded applications (e.g., Adobe Flash and associated JavaScript) in the computer's web browser 130 may be used to read and write LSOs 115 to the computer 110. Thus, the reading and writing of the LSOs 115 becomes the communication mechanism between the computer application 120 (and any hardware attached) and the authenticated user in the server 140 (via the web browser 130 and the configuration application 142).

Using LSOs 115 to allow the web browser 130 and the computer application 120 to communicate with each other allows the configuration application 142 on the server 140 to interact directly with the local computer 110 without initiating additional network traffic or using a third layer service such as an external web server and without requiring separate, external authentication. A hardware connection and/or disconnection event may be reported without the computer application 120 calling the external web server and without the configuration application 142 polling the external web server to inquire about the state of the connected hardware. The present application may avoid this extra timing, authentication, web traffic, and relatively greater complexity.

The system 100 further includes an end user computing device 160, such as a web-enabled personal computer, laptop, smartphone or tablet. The end user computing device 160 includes a web browser 162 that may be configured with non-transitory computer executable instructions to transmit and receive web requests and responses between the end user computing device 160 and the server 140 through a communication channel 166 via the Internet 102 using a web page that may use a client-side scripting language, such as JavaScript, for example. The web browser 162 may serve as the user interface for an end user on the end user computing device 160 to configure the access control system without having to directly access the configuration application 142 on server 140. The end user computing device 160 may be protected from malicious software on the Internet 102 by firewall 164.

Generally, web browser 130 is the only system 100 user interface on the local computer 110 (with the exception of an installer window that may be used to install the computer application 120) and web browser 162 is the only system 100 user interface on the end user computing device 160, each providing an interface for a user to configure and manage the access control devices 182 without requiring the user to perform the configuration at the server 140 location.

The computer application 120 may further use LSOs 115 to coordinate with the web browser 130. The web browser 130 may show "steps" and provide feedback of activity on the computer 110 using LSOs 115 and web browser loops for LSO detection. By utilizing LSOs 115, the access control devices 182 at the site 180 may be managed by the local computer 110, the end user computing device 160, and/or the server 140. The LSOs 115 are used to transfer information, including commands, between the server 140 and the computer 110 to manage the access control devices 182 such as programming, acquiring status, configuring, etc.

Figure 2:
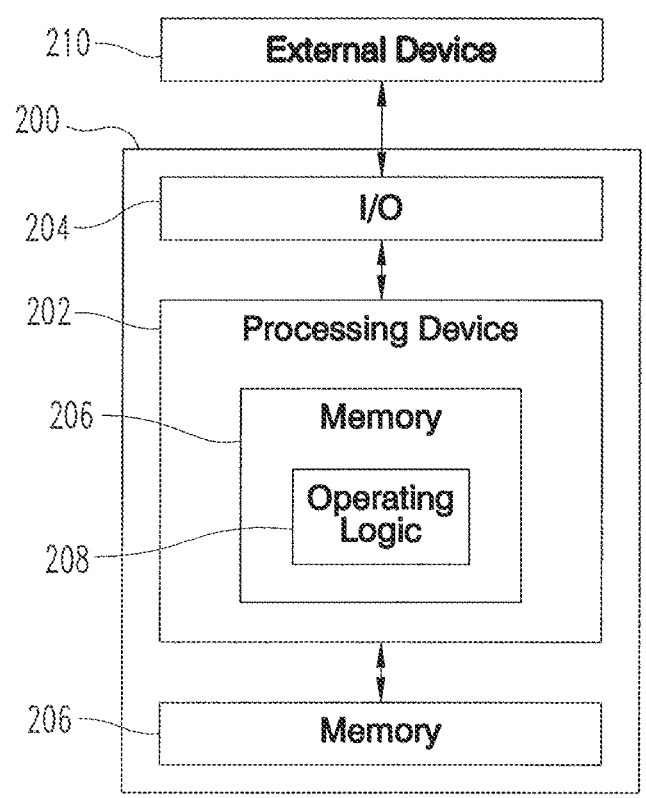
FIG. 2 is a schematic block diagram of an exemplary computing device.

FIG. 2 is a schematic diagram of a computer 200. Examples of the computer 200 may include the server 140, end-user computing device 160, and/or local computer 110 shown in FIG. 1. Computer 200 includes a processing device 202, an input/output device 204, memory 206, and operating logic 208. Furthermore, computer 200 communicates with one or more external devices 210.

The input/output device 204 allows the computer 200 to communicate with the external device 210. For example, the input/output device may be a network adapter, network card, or a port (e.g., a USB port, serial port, parallel port, VGA, DVI, HDMI, FireWire, CAT 5, or any other type of port). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computer 200. For example, the external device 210 may be another computer, a server, a printer, a display, an alarm, an illuminated indicator, a keyboard, a mouse, or a touch screen display. Furthermore, it is contemplated that the external device 210 may be integrated into the computer 200. For example, the computer 200 may be a smartphone, a laptop computer, or a tablet computer in which case the display would be an external device 210, but the display is integrated with the computer 200 as one unit, which is consistent with the general design of smartphones, laptop computers, tablet computers, and the like. It is further contemplated that there may be more than one external device in communication with the computer 200. The computer 110 is one example of an external device 210.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

The configuration application 142, web browsers 130 and 162, and computer application 120 may be implemented as modules on their respective machines. Moreover, the processing devices 202 in the server 140 and in the local computer 110 may include operating logic 208 stored in memory 206. These modules may be implemented in operating logic 208 as operations by software, hardware, artificial intelligence, fuzzy logic, or any combination thereof, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or in part with other modules or devices. The operations of any module may be performed wholly or partially in hardware/software or by other modules. The presented organization of the modules is exemplary only, and other organizations, configurations and arrangements are contemplated.

Figure 3:
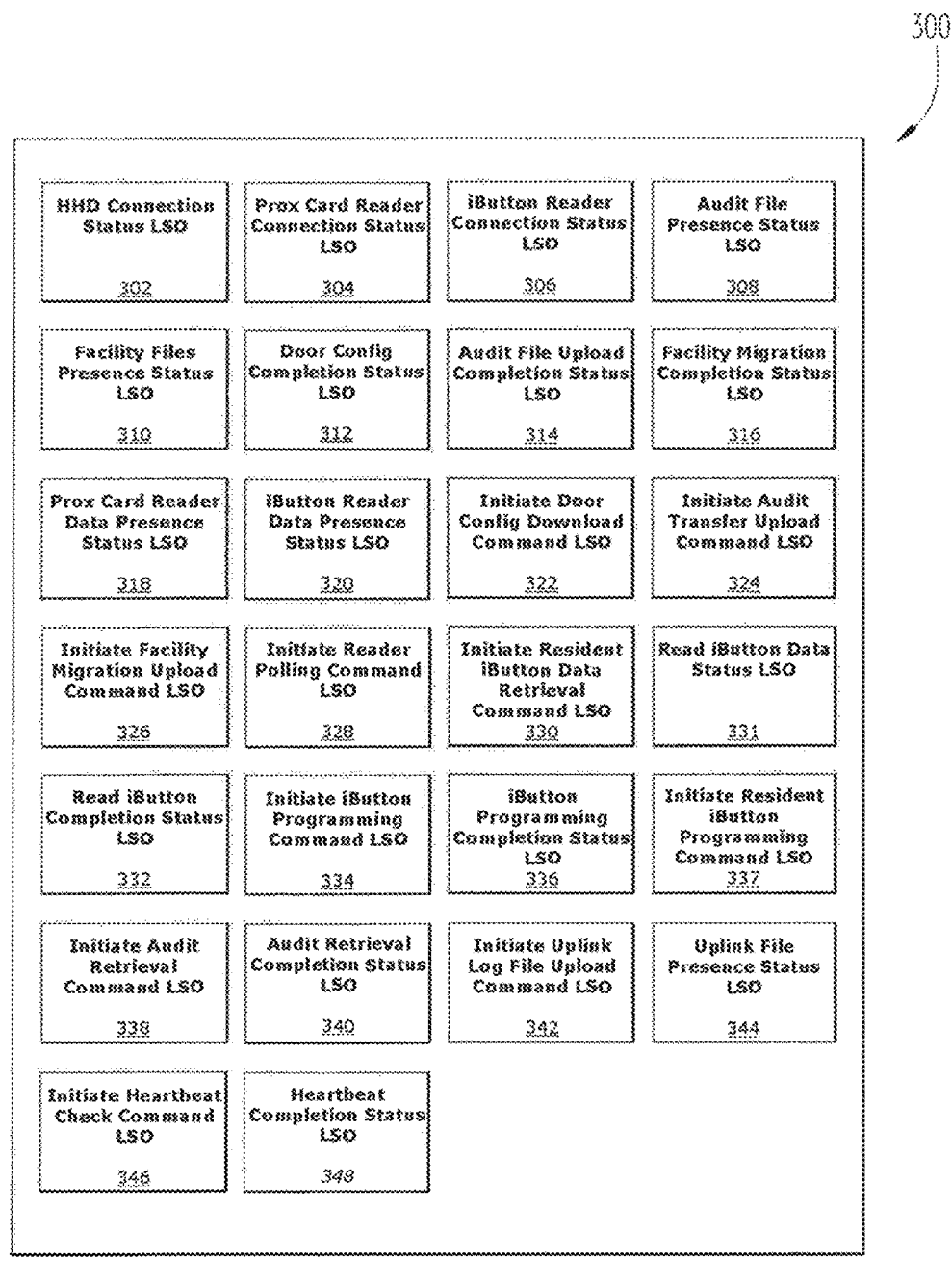
FIG. 3 is a schematic block diagram of an exemplary computing device with various Locally Shared Objects (LSOs) that may be used in an exemplary server and computer interaction system.

FIG. 3 illustrates a schematic block diagram of the local computer 110 with various LSOs 115 that may be used in the system 100. Generally, there are two types of LSOs 115: Status and Command. The local computer 110 creates Status LSOs in order to reflect the status of hardware, events, data, and/or errors. Status LSOs may also include additional data/information. Some Status LSOs are 'presence only' where only the existence of the LSO is relevant. Other Status LSOs include content such as success/failure, data, type, etc. The web browser 130 may create Command LSOs to instruct the local computer 110 to take some action.

The following describes some of the LSOs 115 that may be used in the system 100. The following description is not exhaustive, but rather illustrative of the various LSOs 115 that may be implemented in the system 100.

There may be three Status LSOs related to Hardware Presence Detection. The Handheld Device (HHD) Connection Status LSO 302 may have the filename: hhd_detected.sol and its content includes: {result:'connected'}. The LSO 302 does not require any content as its presence is generally the determining factor, for example, in determining whether handheld device is connected. But the content can be there to simplify the creation of LSO code and keep it consistent. Upon disconnect the 'hhd_detected.sol' file should be deleted by the computer application 120. Thus, the web browser 130 can detect if the HHD is connected or not by the file's presence.

The Prox Card Reader Connection Status LSO 304 may have the filename: prox_reader_detected.sol and the content: {result:'connected'}. The LSO 304 does not require any content as its presence is generally the determining factor, for example, in determining whether a prox reader is connected. But the content can be there to simplify the creation of LSO code. Upon disconnect the 'prox_reader_detected.sol' file should be deleted by the computer application 120. Thus, the web browser 130 can detect if a proximity reader, or prox reader, is connected or not by the file's presence.

The iButton Reader Connection Status LSO 306 may have the filename filename: ibutton_reader_detected.sol and the content: {result:'connected'}. The LSO 306 does not require any content as its presence is generally the determining factor, for example, in determining whether an iButton reader is connected. But the content can be there to simplify the creation of LSO code. Upon disconnect the 'ibutton_reader_detected.sol' file should be deleted by the computer application 120. Thus, the web browser 130 can detect if the iButton reader is connected or not by the file's presence.

There may be two Status LSOs related to File Presence Detection. The Audit File Presence Status LSO 308 may have the filename: audit_data_detected.sol and the content: {result:'present'}. The LSO 308 is written by the computer application 120 after the computer application 120 detects the presence of new audit data that has been synchronized to the local computer 110. The presence of this status LSO 308 informs the web browser 130 that there are audit files waiting to be uploaded to the configuration application 142.

The Facility Files Presence Status LSO 310 may have the filename: facility_data_detected.sol and the content: {result: 'present', data:XYZ}. The LSO 310 is written by the computer application 120 when the computer application 120 is started if the computer application 120 detects the presence of facility files, such as SMS Express LLD facility files. The presence of this status LSO 310 informs the web browser 130 that there are facility files available for migration (e.g., upload and processing). The contents of XYZ in the data field may be a pipe-delimited list of facility file names (not including the file extension).

There may be six Status LSOs related to Reporting Success/Failure. The Door Config Completion Status LSO 312 may have the filename: download_status.sol and the content: {result:'success'} or content: {result:'failure', type: XYZ}. The LSO 312 is written by the computer application 120 when the door XML data has been converted to various formats such as .NDX and .DXX door files and synchronized with the HHD. The result field may be set to 'success' or 'failure' depending upon the outcome of the process. If something went wrong, the type field is set to a value representing where the failure occurred: 'download'=>HTTPS download failed, 'conversion'=>XML to door files conversion failed, and/or 'sync'=>transfer to the HHD failed.

The Audit File Upload Completion Status LSO 314 may have the filename: upload_status.sol and the content: {result:'success'} or content: {result:'failure', type:XYZ}. The LSO 314 is written by the computer application 120 as a response to the audit file upload process. The result field may be set to 'success' or 'failure', depending upon the outcome of the process. If something went wrong, the type field is set to a value representing where the failure occurred: 'upload'=>HTTPS upload/file transfer failed and/or 'parse'=>parsing uploaded file failed.

The Facility Migration Completion Status LSO 316 may have the filename: migrate_status.sol and the content: {result:'success'} or content: {result:'failure', type:XYZ}. The LSO 316 is written by the computer application 120 as a response to the facility migration upload process. The result field will be set to 'success' or 'failure', depending upon the outcome of the process. If something went wrong, the type field is set to a value representing where the failure occurred: 'upload'=>HTTPS upload/file transfer failed and/or 'parse'=>parsing uploaded file failed.

The Read iButton Completion Status LSO 332 may be written by the computer application 120 as a response to retrieving data from an iButton and uploading the data to the database 144. The result field will be set to 'success' or 'failure', depending upon the success of the process.

The iButton Programming Completion Status LSO 336 may have the filename: program_status.sol and the following content: {result:'success', data:ABC, kind:DEF, audits: TRUE/FALSE} or {result:'failure', type:XYZ, data:ABC, kind:DEF, audits:TRUE/FALSE}. This LSO 336 is written by the computer application 120 as a response to the Vendor iButton programming process. The result field will be set to 'success' or 'failure', depending upon how the process went. An iButton ID and a iButton kind are included for failure or success, if available. The audits field is set to true or false, depending upon whether audits were found on the iButton. If something went wrong, the type field is set to a value representing where the failure occurred: 'upload'=>HTTPS POST failed, 'download'=>HTTPS Response to POST failed, 'erase'=>erasing of iButton failed, and/or 'program'=>programming of iButton failed.

The Audit Retrieval Completion Status LSO 340 is written by the computer application 120 as a response to the Audit Retrieval process. The result field will be set to 'success' or 'failure', depending upon how the process went.

The following two Status LSOs relate to Reader Data Detection. The Prox Card Reader Data Presence Status LSO 318 may have the filename: prox_data.sol and the content: {result:'success', data:XYZ}. The LSO 318 is written by the computer application 120 after reading valid (non-zero) prox card data from the reader. The data field will be the bytes read from the prox card by the reader. The presence of this status LSO 318 informs the web browser 130 that there is prox card data waiting to be put into the credential form fields.

The iButton Reader Data Presence Status LSO 320 may have the filename: ibutton_data.sol and the content: {result: 'success', data:XYZ}. The LSO 320 is written by the computer application 120 after reading valid (non-zero) iButton data from the reader. The data field contains the bytes read from the iButton fob by the reader. The presence of this status LSO 320 informs the web browser 130 that there is iButton data waiting to be put into the credential form fields. There may be, for example, 10 Command LSOs. The Command LSOs may have the filename: command.sol and the content {type:TYPE, data:URL, facility:NAME, device:DEVICE}. The computer application 120 may detect the presence of a command LSO, read the command LSO, and take appropriate action based on the type field, including reading the other fields as necessary. The following types are examples of types that are supported (as the TYPE value): download=>Initiate Door Config Download, upload=>Initiate Audit Transfer Upload, migrate=>Initiate Facility Migration Upload, and poll=>Initiate Reader Polling.

With respect to the Initiate Door Config Download Command LSO 322, the computer application 120 may perform an HTTPS GET of the URL in the 'data' field. Upon completion, the computer application 120 may delete this command LSO 322 and create a Door Config Completion Status LSO 312, reporting the success or failure of the operation.

Turning to the Initiate Audit Transfer Upload Command LSO 324, the computer application 120 may bundle up the door audit data into one or more ZIP files and then perform an HTTPS POST to the URL in the 'data' field. Upon completion, the computer application 120 may delete this command LSO 324 and create an Audit File Upload Completion Status LSO 314, reporting the success or failure of the operation.

Next, with respect to the Initiate Facility Migration Upload Command LSO 326, the computer application 120 may locate the LLD facility file as named in the 'facility' field. The computer application 120 will decrypt it, convert it to a set of XML files, bundle them into one or more ZIP files, and perform an HTTPS POST to the URL in the 'data' field. Upon completion, the application may delete this command LSO 326, and create a Facility Migration Completion Status LSO 316, reporting the success or failure of the operation.

Turning to the Initiate Reader Polling Command LSO 328, the computer application 120 may begin to poll the prox card reader or iButton reader (as determined by the 'device' field). The polling interval may be 1 second until the computer application 120 receives a valid response or until the max timeout (30 seconds, for example). Upon completion, the computer application 120 will delete this command LSO 328. If valid data was read, the computer application 120 may create a Prox Card Reader Data Presence Status LSO 318 or an iButton Reader Data Presence Status LSO 320, and write the data from the reader into the LSO 318 or 320.

Next, with respect to the Initiate Resident iButton Data Retrieval Command LSO 330, the computer may begin to poll a Resident iButton. The polling interval may be 1 second until the computer application 120 receives a valid response or until the max timeout (30 seconds, for example). Upon completion, the computer application 120 will delete this command LSO 328. If valid data was read, the computer application 120 may create a Read iButton Data Status LSO 331 and write the data in a JSON package into the Read iButton Data Status LSO 331. The web browser 130 may then read the LSO 331, extract the JSON package, and transmit the JSON package to the server 140 via an Ajax HTTP PUT call.

Turning to the Initiate iButton Programming Command LSO 336, which may be used for writing XML data to a Vendor iButton or other programmable iButton, the computer application 120 may begin to poll the iButton reader. The polling interval may be 1 second until it gets a valid response or until the max timeout (30 seconds). It is contemplated that an additional command LSO, such as Initiate Resident iButton Programming Command LSO 337, for example, would be used to write XML data to a Resident iButton. It is further contemplated that that an additional command LSO, such as Initiate Resident iButton Data Retrieval Command LSO, for example, would be used for reading JSON data from a resident iButton.Next, with respect to the Initiate Audit Retrieval Command LSO 340, the computer application 120 may begin to poll the iButton reader. The polling interval may be 1 second until it gets a valid response or until the max timeout (30 seconds, for example). If valid data was read, and the iButton has audit data, the computer application 120 may pull the audit data off of the iButton and bundle it into a single ZIP file. The computer application 120 may then do an HTTPS POST to the URL in the 'data' field, passing in the audit data zip file. The response of the POST may indicate success or failure of the parsing of the audit data. The computer application 120 may delete this command LSO and create a Vendor Audit Retrieval Status LSO and write the data from the reader into that LSO, including the iButton kind and a boolean flag marking whether the audit data was transferred or not, as well as the success or failure of the process. If there was no audit data, the computer application 120 may just create the Status LSO and not perform the HTTPS POST.

It is contemplated that additional command LSOs will be created and used for communication purposes between the computer application 120 and the web browser 130. For example, an Initiate Uplink Log File Upload Command LSO 342 may be created and used for sending an uplink file from the HHD 170 to the server 140. Initiate Uplink Log File Upload Command LSO 342 may have a corresponding status LSO: Uplink File Presence Status LSO 344 that works similar to the Audit File Presence Status LSO 308, but the filename is 'uplink_status.sol'. The purpose of LSO 344 is that when the HHD 170 is used to tour locks, the software on the HHD 170 creates an uplink.log file which includes timestamps for each lock indicating when it was toured with the HHD 170. When the HHD 170 is plugged back into the computer 110, the computer application 120 detects that uplink.log file on the HHD 170 and creates the uplink_status.sol LSO status file 344. This communicates to the web browser 130 that there is an uplink.log file available for retrieval. The web browser 130 then automatically creates the Command LSO 342, which the computer application 120 receives, and because it is type 'uplink', it pulls the uplink.log file off the HHD 170, zips it, sends it to the server 140, and then deletes the Command LSO 342 and the Status LSO 344. This may be different from other commands because the presence of the Status LSO 344 means that the web browser 130, via JavaScript, for example, may just create the Command LSO 342 separate from any user interaction. Generally, there is no user interaction for Command LSO 342. The Status LSO 344 may be a "presence status" LSO, similar to the Audit File Presence Status LSO 308. On the server 140, the zip file is unzipped, the uplink.log file is parsed, and the doors that were toured are updated in the database 144 to reflect the status in which they were toured.

In another additional command LSO example, an Initiate Heartbeat Check Command LSO 346 is created for checking whether the computer application 120 is running and/or and receiving commands. Command LSO 346 may be initiated by the user clicking a button to determine whether the computer application 120 is running and/or and receiving commands. Command LSO 346 may further be initiated automatically, by the web browser 130, running JavaScript, for example, on a page without any direct user action. For example, when the user logs into the server 140 via the web browser 130, the heartbeat command may be initiated by the web browser 130 page upon successful login. The Command LSO 346 is detected by the computer application 120 and, because it is type 'heartbeat', the computer application 120 may create a status LSO, such as a Heartbeat Completion Status LSO 348 reporting a success or failure status. When the web browser 130 detects the Status LSO 348, the web browser 130 may create a session cookie in the web browser 130 that identifies that the computer application 120 is running and receiving commands.

If the browser does not detect the Heartbeat Completion Status LSO 348 within a predetermined time period, such as 5 seconds, for example, it may be determined to have timed out and may create a session cookie in the web browser 130 that states the computer application 120 is not running and/or not receiving commands. This, in turn, may cause a warning flag to appear at the top of the web browser 130 page which can direct the user to a download page to download and install or re-install the computer application 130. The heartbeat command may be repeated at various intervals automatically so that the web browser 130 has an up-to-date session of the state of the computer application 120. The Heartbeat Completion Status LSO 348 is a 'presence file', indicating a status merely by the file being present. The Heartbeat Completion Status LSO 340 may further include the software version of the computer application 120, such that when the web browser 130 receives the Status LSO 340 it can record in the session cookie the running version of the computer application 120 and if that version is older than the latest version on the server, it may cause a warning flag to appear that communicates to the user that their computer application 120 is out-of-date and a newer version is available.

It is contemplated that various access control devices and technologies may be used in the system other than proximity cards and iButton. For example, the readers may use any type of technology or multiple technologies such as Bluetooth, Near Field Communication (NFC), ISO/IEC 14443, etc.

FIGS. 4-8 illustrate various schematic block diagrams of the LSO file format used in the system 100. The LSO file format may be based on the Action Message Format 3 (AMF3) published by Adobe Systems, Inc. There are at least two types of LSO objects used by the system 100: LSOs 115 that contain only a string and LSOs 115 that contain an object of key/value pairs. For purposes of the present application, the LSO file format contains a number of bytes which can be ignored. A parser may use them for validation, however all examples in the present application will ignore them for simplicity.

Figure 4:
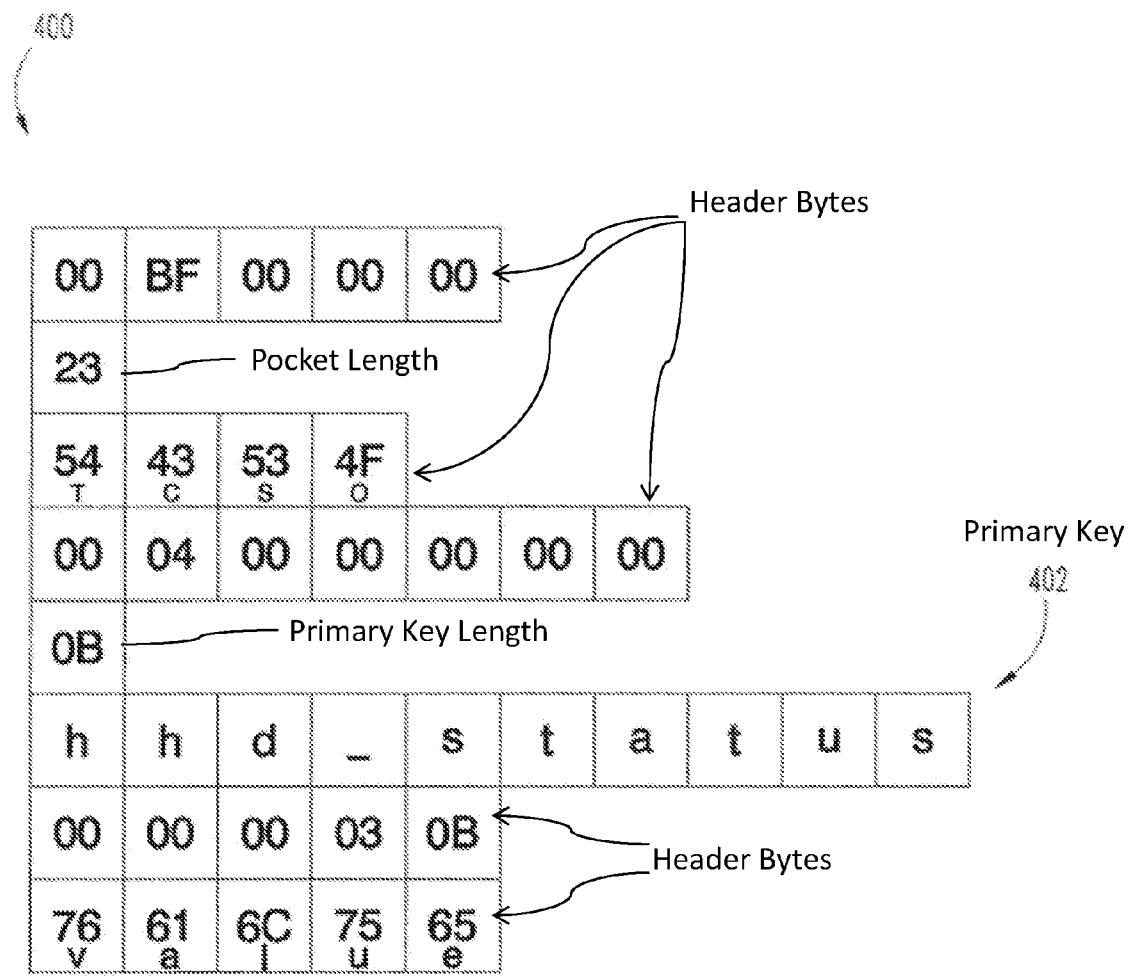
FIG. 4 is a schematic block diagram of an exemplary LSO file header.

FIG. 4 illustrates a schematic block diagram of an LSO file header 400. Generally all types of LSOs 115 begin with the same header. The header 400 contains the primary key 402 of the object. This is the key 402 the configuration application 142 and the computer application 120 use to communicate with each other. The key 402 will typically be the base name of the file on the local computer 110. One example is the HHD Connection Status LSO 302. The local computer 110 and the configuration application 142 will use the key "hhd_status" 402 as seen in FIG. 4. This will be the key 402 in the header 400 and the file 302 will be named "hhd_status.sol". Each square in the header 400 is a byte. The bytes are broken down into lines for readability.

Figure 5:
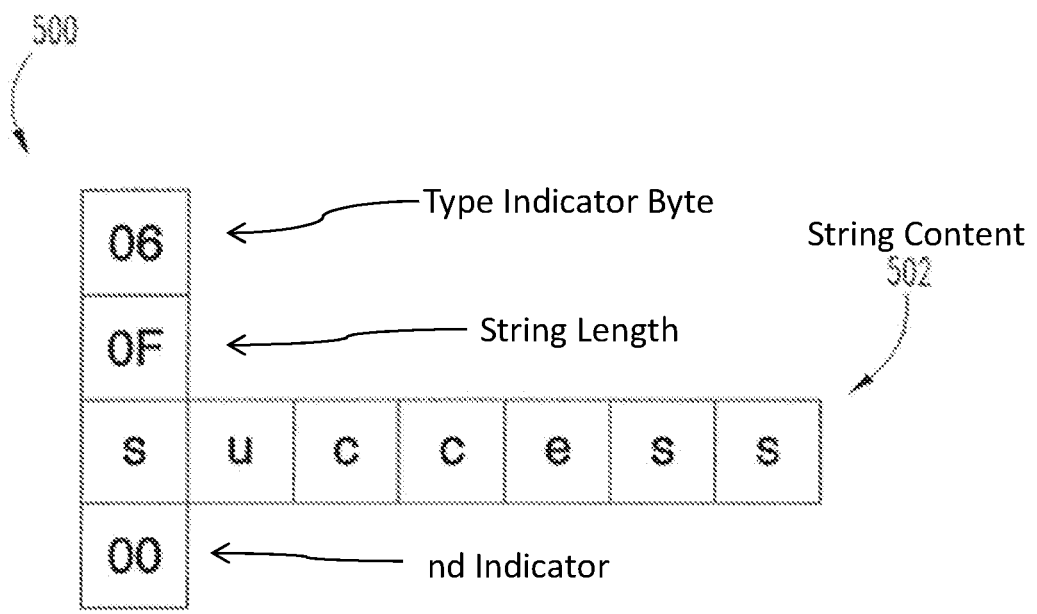
FIG. 5 is a schematic block diagram of an exemplary LSO file.

FIG. 5 illustrates a schematic block diagram of a string-only LSO file 500. Immediately following the header 400 is a byte describing the type of payload in the LSO 115. For purposes of this application, the value 0x06 indicates string-only LSO files and the value 0x0A indicates LSO files containing a key value pair object.

The length of the string, in this example 0x0F, cannot be used directly. It is an encoded integer. To determine the proper value, the lowest bit is discarded. For example, length>>1. In this case, 0x0F shifted right once is 7, which is the length of the string "success"—the string content 502. Immediately following the string 502 is a null byte, 0x00, which indicates the end of the object.

Figure 6:
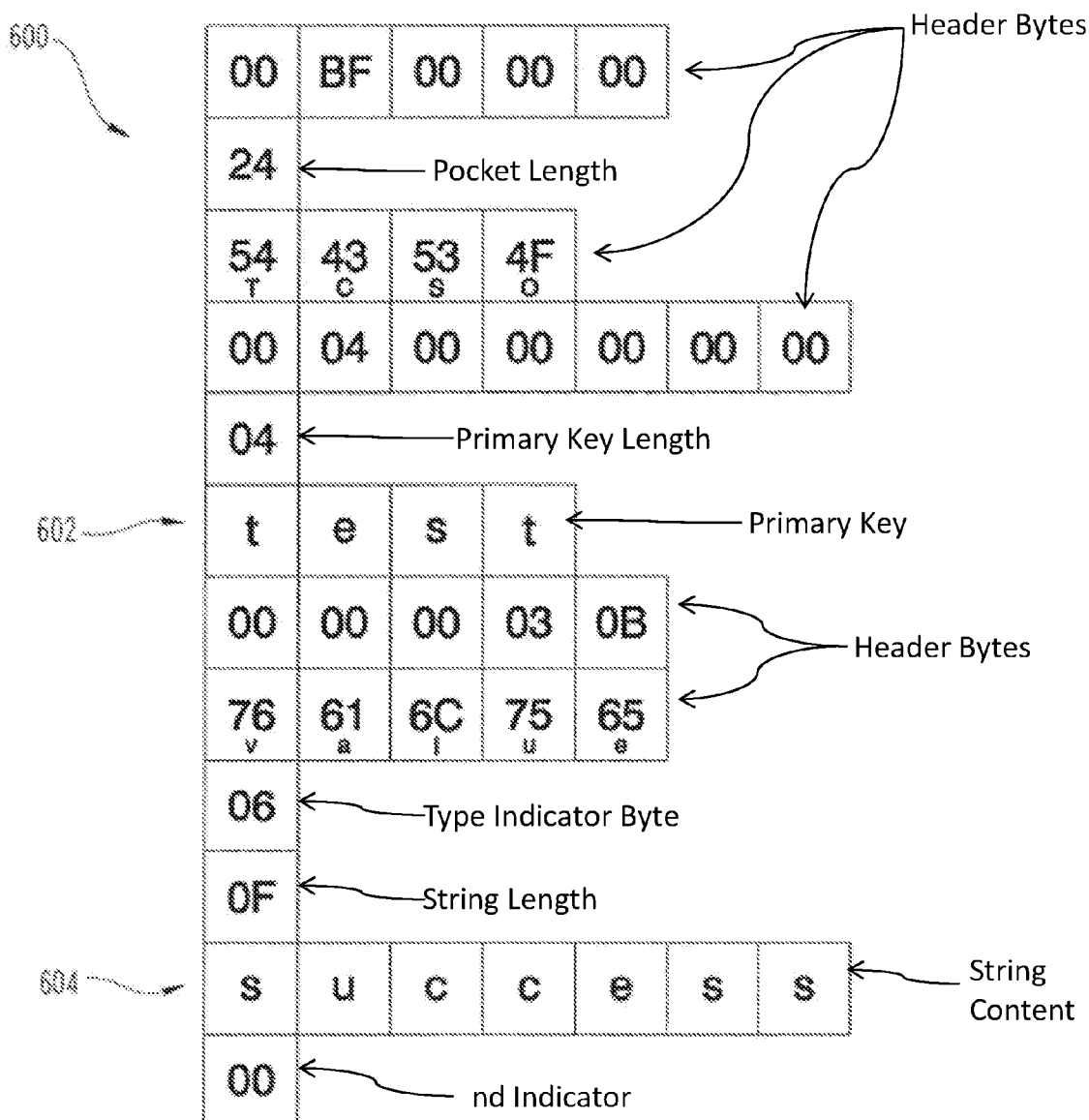
FIG. 6 is a diagram for an exemplary complete string-only LSO.

FIG. 6 illustrates a diagram for a complete string-only LSO 500 using the primary key "test" 602 and containing the string "success" 604.

Figure 7:
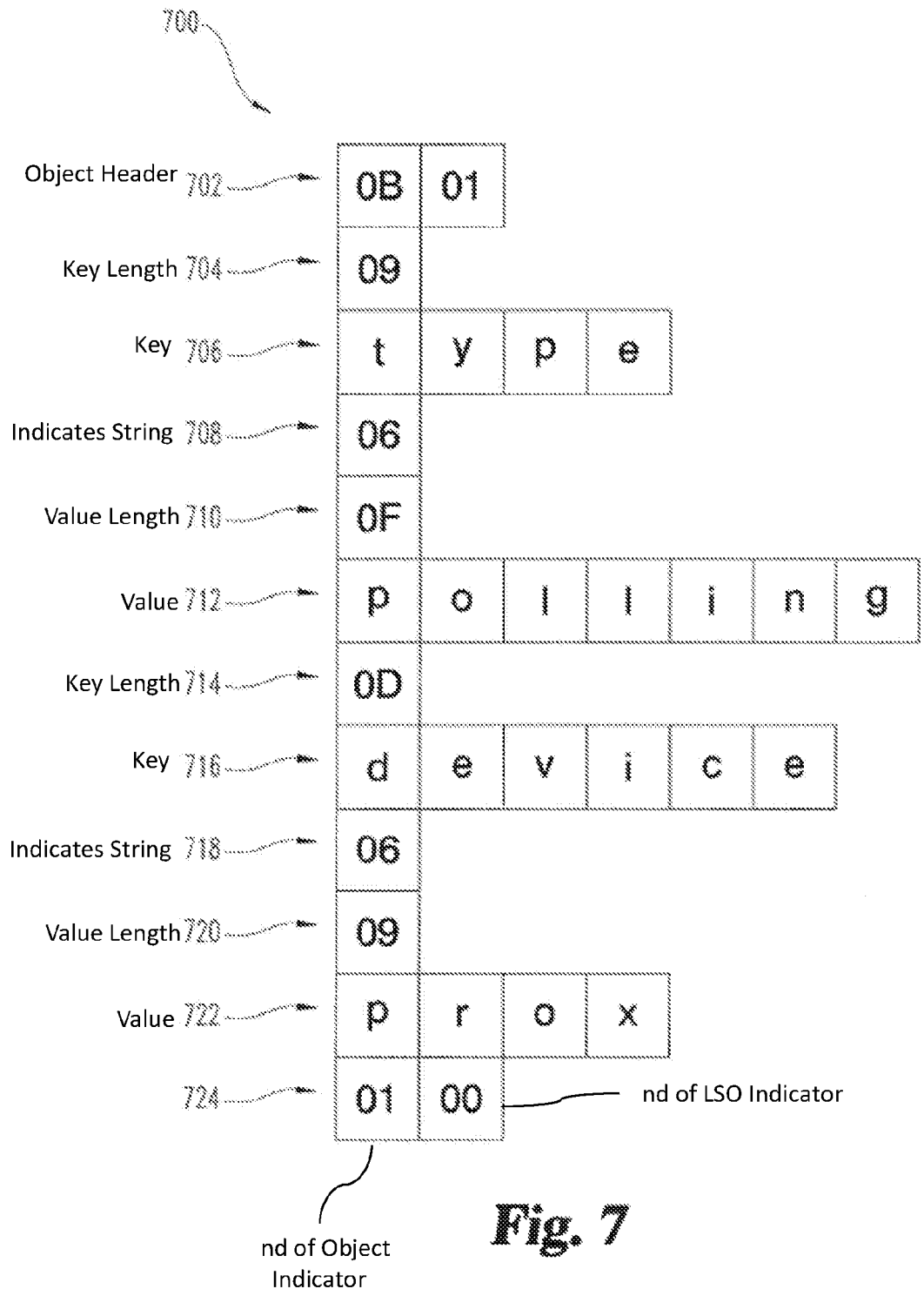
FIG. 7 is a diagram for an exemplary LSO file containing objects.

FIG. 7 illustrates a diagram for an LSO file 700 containing objects. The first row is the header 702 of the LSO 700. The second row is the length 704 of the key 706. The third row is the key 706. The fourth row includes a value 708 that indicates that the object is a string. The fifth row includes a length 710 of value. The sixth row includes a value 712 "polling". The seventh row includes a length 714 of value. The eighth row includes a key 716 "device". The ninth row has value 718 which indicates the object value is a string. The tenth row includes a value 720 "prox". The eleventh row has values 724 that indicate the end of an object and the end of the LSO 700. Each key value pair is encoded as the length of the key, the key, the value type indicator byte (which is 0x06 to indicate a string, for purposes of the present application), the length of the value, and then the value. Key value pairs may continue to be extracted until the key length byte is 0x01. In this example, all length value bytes discard the lowest bit (shifted) as described above.

Figure 8:
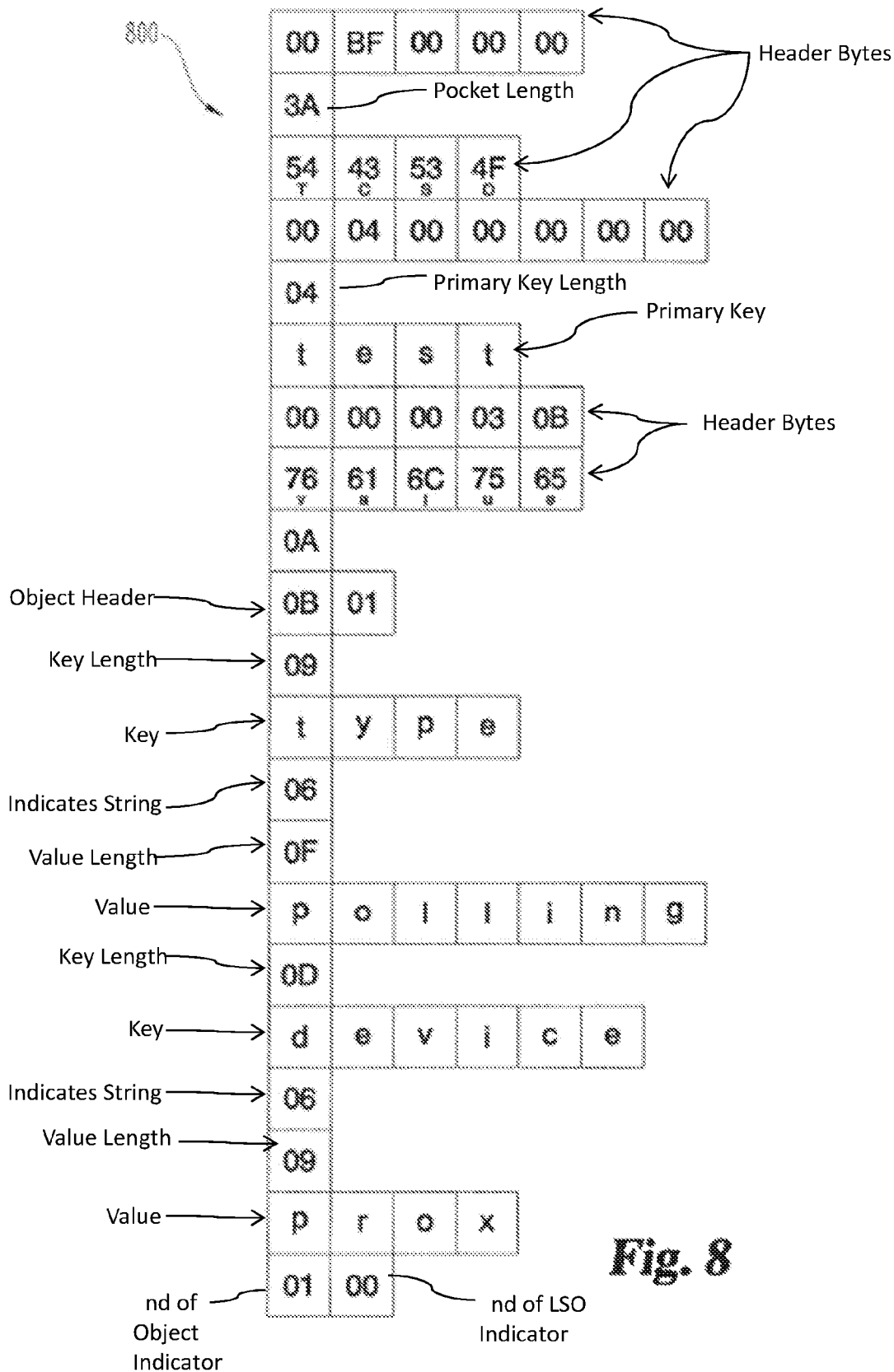
FIG. 8 illustrates a schematic block diagram of an exemplary complete object LSO containing key value pairs.

FIG. 8 illustrates a schematic block diagram of an exemplary complete object LSO 800 containing the key value pairs 'type'=>'polling' and 'device'=>'prox'.

The techniques in FIGS. 9-14 are exemplary of some of the ways in which LSOs 115 may be used in the system 100. Operations illustrated are understood to be examples only, and operations may be combined or divided, and added or removed, as well as re-ordered in whole or in part, unless explicitly stated to the contrary.

Figure 9:
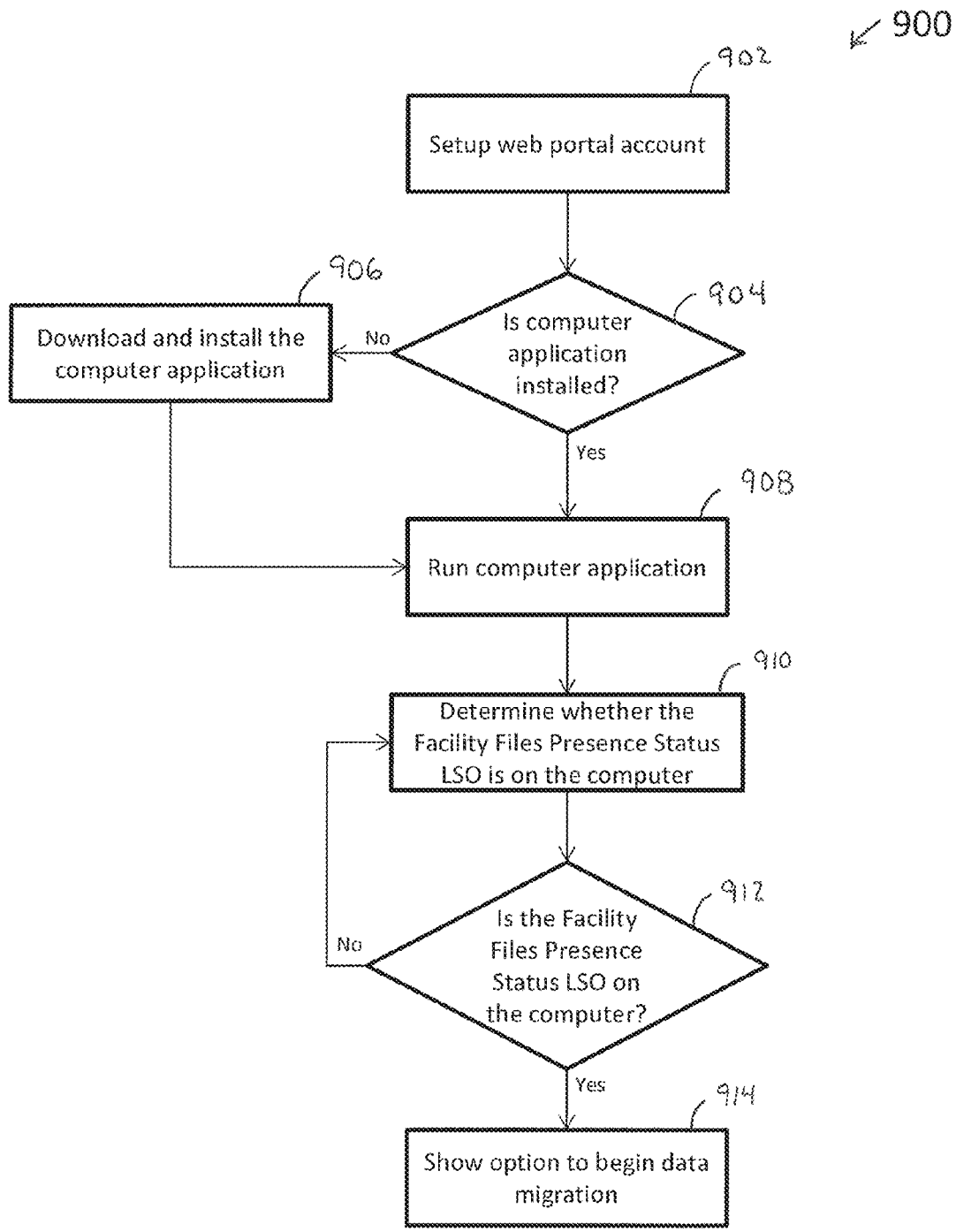
FIG. 9 is a schematic flow diagram of an exemplary technique for creating a web portal account.

FIG. 9 is a schematic flow diagram of a technique 900 for creating a web portal account. In operation 902, a user sets up his or her portal account. At conditional 904, the web browser 130 determines whether computer application 120 is installed. If computer application 120 is not installed, the user is prompted to download the computer application installer and instructed to install the computer application 120 on the computer 110 that will interface with a handheld device (HHD) and/or reader at operation 906. If computer application 120 is installed, at operation 908 the computer application 120 is started. At operation 910, the web browser 130 determines whether the Facility Files Presence Status LSO 310 is on the local computer 110. If the LSO 310 is determined to be on the local computer 110 at conditional 912, technique 900 proceeds to operation 914 where the web browser 130 will show the option to begin data migration, which is discussed in technique 1100. If the LSO 310 is determined not to be on the local computer 110, technique 900 returns to operation 910.

Figure 10:
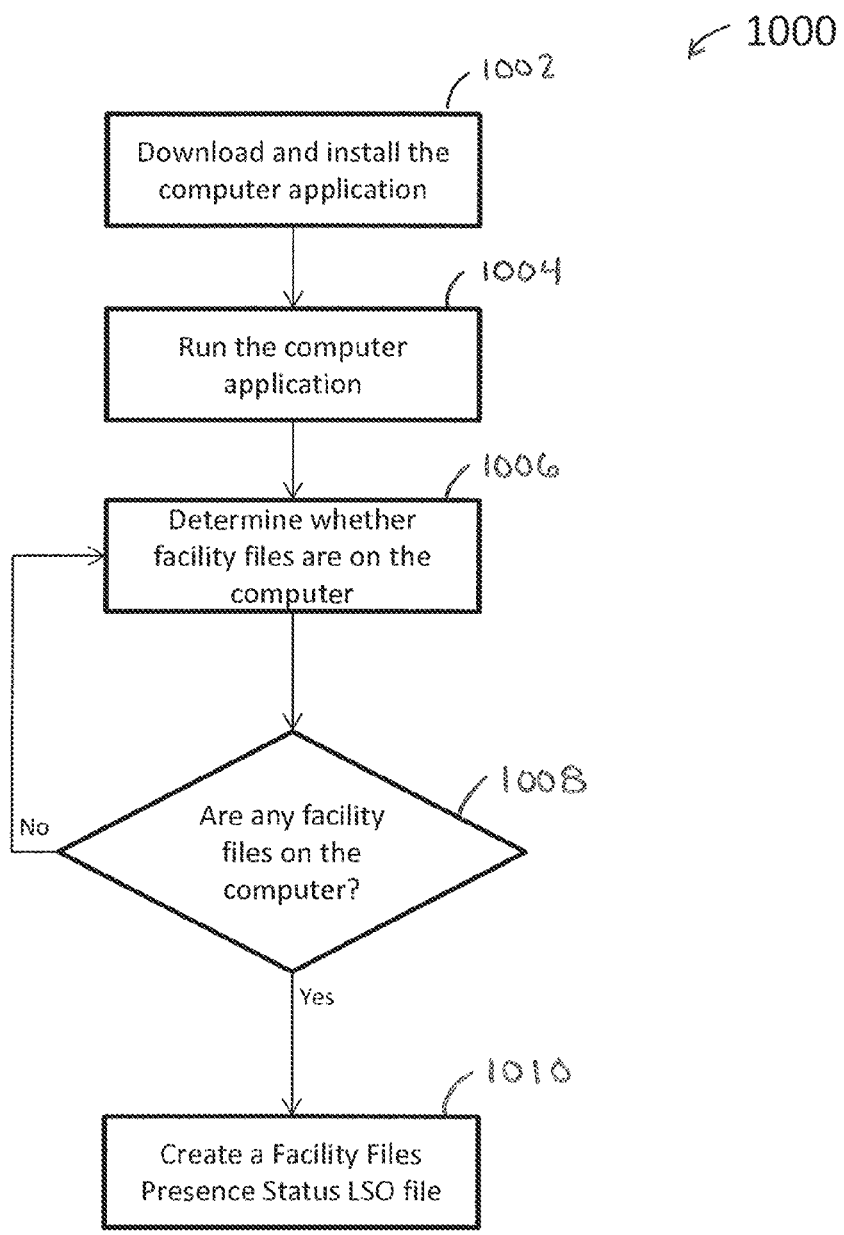
FIG. 10 is a schematic flow diagram of an exemplary technique for configuring a computing device.

FIG. 10 is a schematic flow diagram of a technique 1000 for configuring the local computer 110. In operation 1002, the user downloads and installs the computer application 120. When the installation is complete, at operation 1004, the computer application 120 is started. In operation 1006, the computer application 120 determines whether there are any facility files 117, such as SMS Express facility files (LLD files), present on the local computer 110. If it is determined that there are any facility files 117 present at conditional 1008, technique 1000 proceeds to operation 1010, where the application 120 creates a Facility Files Presence Status LSO 310 with a pipe-delimited list of facility names (taken from the file names of the files that were detected). If it is determined that there are not any facility files 117 present at conditional 1008, technique 1000 returns to operation 1006.

Figure 11:
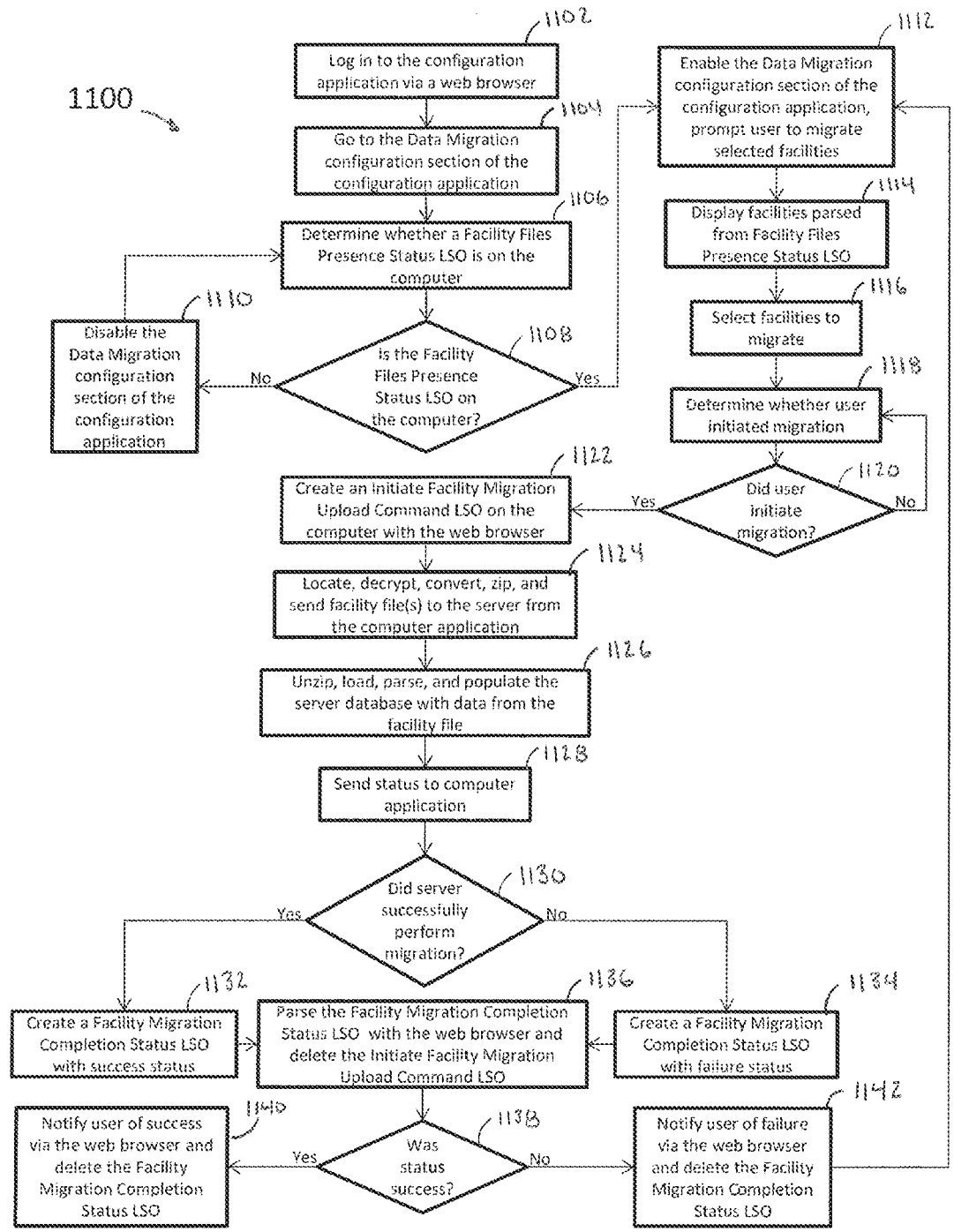
FIG. 11 is a schematic flow diagram of an exemplary technique for uploading facility data.

FIG. 11 is a schematic flow diagram of a technique 1100 for uploading facility data (i.e., data migration). In operation 1102, the user logs in and technique 1102 proceeds to 1104 where the user goes to the "Data Migration" section of their chosen site in the configuration application 142. It is contemplated that this could be an optional step when creating and/or editing a site. Technique 1100 proceeds to operation 1106 to determine whether the Facility Files Presence Status LSO 310 is on the local computer 110. The web page may run JavaScript to detect the Facility Files Presence Status LSO 310 and do one of two things at conditional 1108: 1) If the LSO 310 is not present, technique 1100 proceeds to operation 1110 where the web page is disabled and includes the content: "Facilities to migrate could not be found on the local computer." Technique 1100 then returns to operation 1106. 2) If the LSO 310 is present and the facility files 117 are available to migrate, technique 1100 proceeds to operation 1112 where the web page is not disabled and the user is prompted to start the facility files 117 migration process.

Technique 1100 proceeds to operation 1114, where the web browser 130 reads the Facility Files Presence Status LSO 310 to get the list of facility names and shows them in a form for user selection. In operation 1116, the user then chooses one or more of the facilities to migrate/import for the given site 180. At operation 1118, it is determined whether the user has clicked the "Start Migration" button. If at conditional 1120 it is determined the user has not yet clicked the "Start Migration" button, technique 1100 loops back to operation 1118. If at conditional 1120 it is determined the user clicked the "Start Migration" button, technique 1100 proceeds at operation 1122 where a pop-up modal window appears in the web browser 130 showing the status: "Starting facility upload for 'XYZ' . . . " (where "XYZ" would be the name of the facility chosen in the previous step). Further at operation 1122, the pop-up modal runs JavaScript that creates an Initiate Facility Migration Upload Command LSO 326 that includes the name of the facility file 117 to migrate and the URL to call.

In operation 1124, the computer application 120 detects the Command LSO 326, reads it, and because it is a 'migrate' command, starts the migration/upload process: 1) the computer application 120 locates the facility file 117, such as a LLD file, based upon the 'facility' value in the LSO 326; 2) the computer application 120 decrypts the LLD file into an MDB file; 3) the computer application 120 converts the MDB file into a set of XML files; 4) the computer application 120 zips them into one or more ZIP files; 5) The computer application 120 sends the ZIP file as an HTTPS POST to the URL in the 'data' field of the LSO 326.

In operation 1126, the configuration application 142 on the server 140 receives the HTTPS POST and does the following: 1) unpacks the ZIP file; 2) loads and parses the collection of XML files; 3) populates the database 144 with the facility data for the given site 180; and 4) responds with either success (status 200) or failure (status 500).

In operation 1128, the server 140 sends the response to the HTTPS POST and the computer application 120 receives it. In conditional 1130 it is determined whether the server 140 successfully performed the migration. If conditional 1130 was a successful migration, the response is success (status 200), a Facility Migration Completion Status LSO 316 is created at operation 1132 that includes: result='success'. If conditional 1130 was not a successful migration, the response is a failure (status 500), the Facility Migration Completion Status LSO 316 is created at operation 1134 that includes: result='failure' and type='upload'.

In operation 1136, when the web browser 130, using JavaScript for example, detects the Facility Migration Completion Status LSO 316, the web browser 130 reads the LSO 316 and the computer application 120 deletes the Command LSO 326. At conditional 1138, it is determined whether the status was a success or failure. If conditional 1138 was a success, technique 1100 proceeds to operation 1140 where the web browser 130 shows: "Facility migration complete. You can archive or delete your local LLD facility file named 'XYZ'." (where "XYZ" is the name of the LLD file that was migrated and then deletes the Facility Migration Completion Status LSO 316). If conditional 1138 was a failure, technique 1100 proceeds at operation 1142 where the web browser 130 shows the failure message and proceeds to operation 1112 to offer the option to try again.

Figure 12:
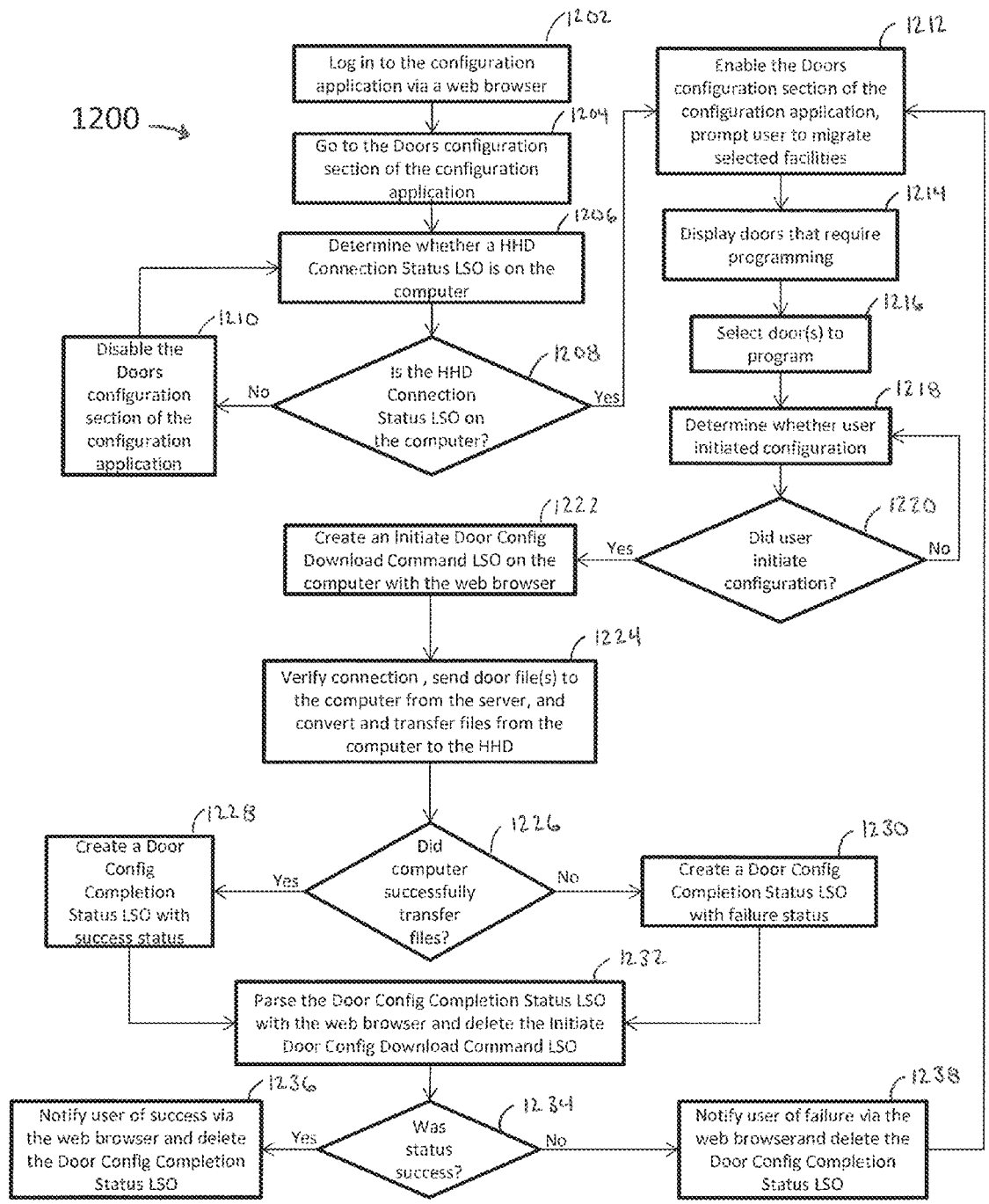
FIG. 12 is a schematic flow diagram of an exemplary technique for downloading configuration data and/or programming access control devices.

FIG. 12 illustrates a schematic flow diagram of a technique 1200 for downloading configuration data and programming access control devices. In operation 1202, the user logs in via the web browser 130 and in operation 1204 goes to the "Programming Doors" sub-tab under the "Doors" tab using the web browser 130. In operation 1206, the web browser 130 determines, using for example, JavaScript, whether the HHD Connection Status LSO 302 in on the local computer 110. At conditional 1208, if it is determined that LSO 302 is not present on the local computer, meaning the HHD 170 is not detected, technique 1200 proceeds to operation 1210, where the web browser page is disabled and includes the content: "In order to program doors, you must plug in your HHD first." Technique 1200 returns to operation 1206 where the web browser page includes JavaScript that will run in a loop to keep trying to detect the Status LSO 302. When the user plugs in the HHD 170, the computer application 120 detects the connection and creates the Status LSO 302. If at conditional 1208, it is determined the LSO 302 is present on the local computer 110, meaning the HHD 170 is detected, technique 1200 proceeds to 1212, where the web page is enabled. In operation 1214 the web page displays a list of doors (i.e., access control devices such electronic locks and/or readers) that require programming and operation 1216 prompts the user to select one or more doors to program.

Technique 1200 proceeds from operation 1216 to operation 1218, where it is determined whether the user has selected some or all of the doors and clicked the "Program Doors" button to initiate configuration of the selected doors. At conditional 1220, if it is determined that the user has initiated configuration of the selected doors, technique 1200 proceeds to operation 1222, where a pop-up modal window appears showing the status: "Starting door configuration process . . . " In operation 1222, the JavaScript in the web browser 130 creates an Initiate Door Config Download Command LSO 322. The web browser 130 includes a "close" button on the pop-up modal. When the user clicks the "close" button, the web browser 130 redirects to the main doors list page and highlights all the doors that have just been programmed.

In operation 1224, the computer application 120 detects the Command LSO 322, reads it, sees that it is of type 'download' and starts the download process: 1) the computer application 120 initiates an HTTPS GET to the URL in the 'data' field of the LSO 322; 2) the server 140 uses the nonce value in the URL to verify the connection and generate the XML data of all the door files; 3) the server 140 sends the XML file, including a 200 OK Success response; 4) the computer application 120 converts the XML file into an .NDX file and set of .Dxx door files; and 5) the computer application 120 transfers the .NDX and .Dxx files to the HHD 170.

Technique 1200 continues at conditional 1226, where it is determined whether the local computer successfully transferred the files to the HHD 170. If conditional 1226 is successful, technique 1200 proceeds to operation 1228, where the computer application 120 creates a Door Config Completion Status LSO 312 with result='success'. If conditional 1226 fails, technique 1200 proceeds to operation 1230 where the computer application 120 creates a Door Config Completion Status LSO 312 with result='failure'. The type of the failure depends upon where the failure happened: If the HTTPS GET returns a failure (401/500), the type is set to 'download'. If the conversion from XML to .NDX and .Dxx files fails, the type is set to 'conversion'. If the synchronization fails, the type is set to 'sync'.

In operation 1232, the computer application 120 creates a Door Config Completion Status LSO 312 with details of the success or failure of the process and the computer application 120 deletes the Command LSO 322. Technique 1200 proceeds from operation 1232 to conditional 1234 where it is determined whether the status was a success. In operation 1234, when the web browser 130 detects, using JavaScript for example, the Door Config Completion Status LSO 312, the web browser 130 reads the LSO 312 to determine whether the status was a success. On success, technique 1200 continues to 1236, where the web browser 130 shows: "Door configuration complete. Please disconnect the HHD and program each lock." (see operation 1220) and then deletes the Door Config Completion Status LSO 312. If conditional 1234 failed, technique 1200 proceeds to operation 1238 where the web browser 130 shows the failure message and offers the option to try again by returning to operation 1212.

Figure 13:
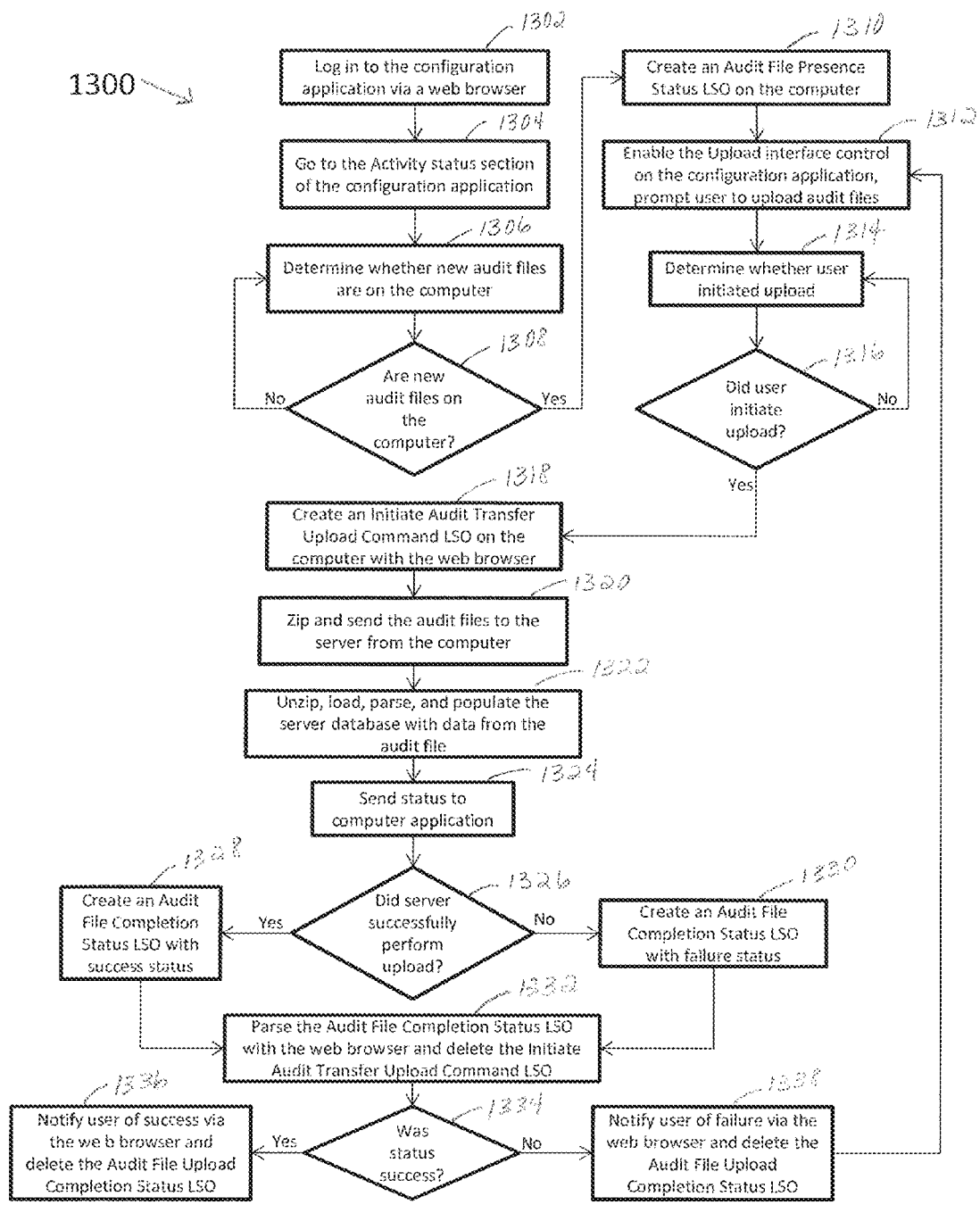
FIG. 13 is a schematic flow diagram of an exemplary technique for uploading lock audit data.

FIG. 13 illustrates a schematic flow diagram of a technique 1300 for uploading lock audit data. In operation 1302, the user logs in to the configuration application 142 via the web browser 130.

In operation 1304, the logged-in user goes to the "Activity" tab. This page in the web browser 130 may run JavaScript to detect the Audit File Presence Status LSO 308. If the LSO 308 is present on the local computer 110, technique 1300 jumps to operation 1312 discussed in further detail below.

In operation 1306 it is determined whether new audit files are on the computer and proceeds to conditional 1308. If it is determined there are no new audit files detected at conditional 1308, technique 1300 proceeds returns to operation 1306. If at conditional 1308 there are new audit files detected on the computer, technique 1300 proceeds to operation 1310.

In operation 1310, the computer application 120 creates the Audit File Presence Status LSO 308 if the computer application 120 detects that there are new audit files 117 on the local computer 110. Typically, the computer application 120 will automatically transfer audit files from the HHD 170 to a designated LSO file folder 114 on the local computer 110 whenever an HHD 170 is connected.

In operation 1312, the web browser 130 is enabled and shows a message and button: "There are new audit files to upload. Click 'upload' to begin the upload process" and technique 1300 continues at operation 1314. In operation 1314, it is determined whether the user initiated the upload by clicking the 'upload' button in the web browser 130.

Technique 1300 continues from 1314 to conditional 1316, where if it is determined the user did not initiate the upload, technique 1300 returns to operation 1314. If it is determined the user did initiate the upload at conditional 1316, technique 1300 proceeds to operation 1318, where a pop-up modal window appears showing the status: "Starting audit data upload . . . " In operation 1318, the JavaScript in the web browser 130 creates an Initiate Audit Transfer Upload Command LSO 324 that includes the URL for the upload HTTPS POST.

In operation 1320, the computer application 120 detects the Command LSO 324, reads it, sees that it is of type 'upload' and starts the audit upload process: The computer application 120 zips the door audit files 117 into one or more ZIP files. The computer application 120 sends the ZIP file as an HTTPS POST upload to the URL in the 'data' field of the LSO 324.

In operation 1322, the configuration application 142 on the server 140 receives the HTTPS POST and performs the following: unpacks the ZIP file, loads and parses the collection of door audit files 117, populates the database 144 with the audit data for the given site, and responds with either success (status 200) or failure (status 500) in operation 1324.

Technique 1300 proceeds to conditional 1326 where the computer application 120 receives the response to the HTTPS POST, it is determined whether the server successfully performed the upload, and the computer application 120 creates an Audit File Upload Completion Status LSO 314. If conditional 1326 is successful, the response is a success (status 200), technique 1300 proceeds to operation 1328 where the LSO 314 includes: result='success'. If conditional 1326 is not successful, the response is a failure (status 500), the LSO 314 includes: result='failure' and type='upload' in operation 1330.

In operation 1332, the web browser 130 detects and reads, using JavaScript for example, the Audit File Upload Completion Status LSO 314. Technique 1300 proceeds at conditional 1334, where it is determined whether the status was successful. If conditional 1334 was successful, technique 1300 proceeds to operation 1336, where the web browser 130 shows: "Door audit data upload complete." and then deletes the Audit File Upload Completion Status LSO 314. If conditional 1334 was not successful, technique 1300 proceeds to operation 1338, where the web browser 130 shows the failure message, the computer application 120 deletes the Command LSO 324, and technique 1300 returns to operation 1312.

Figure 14:
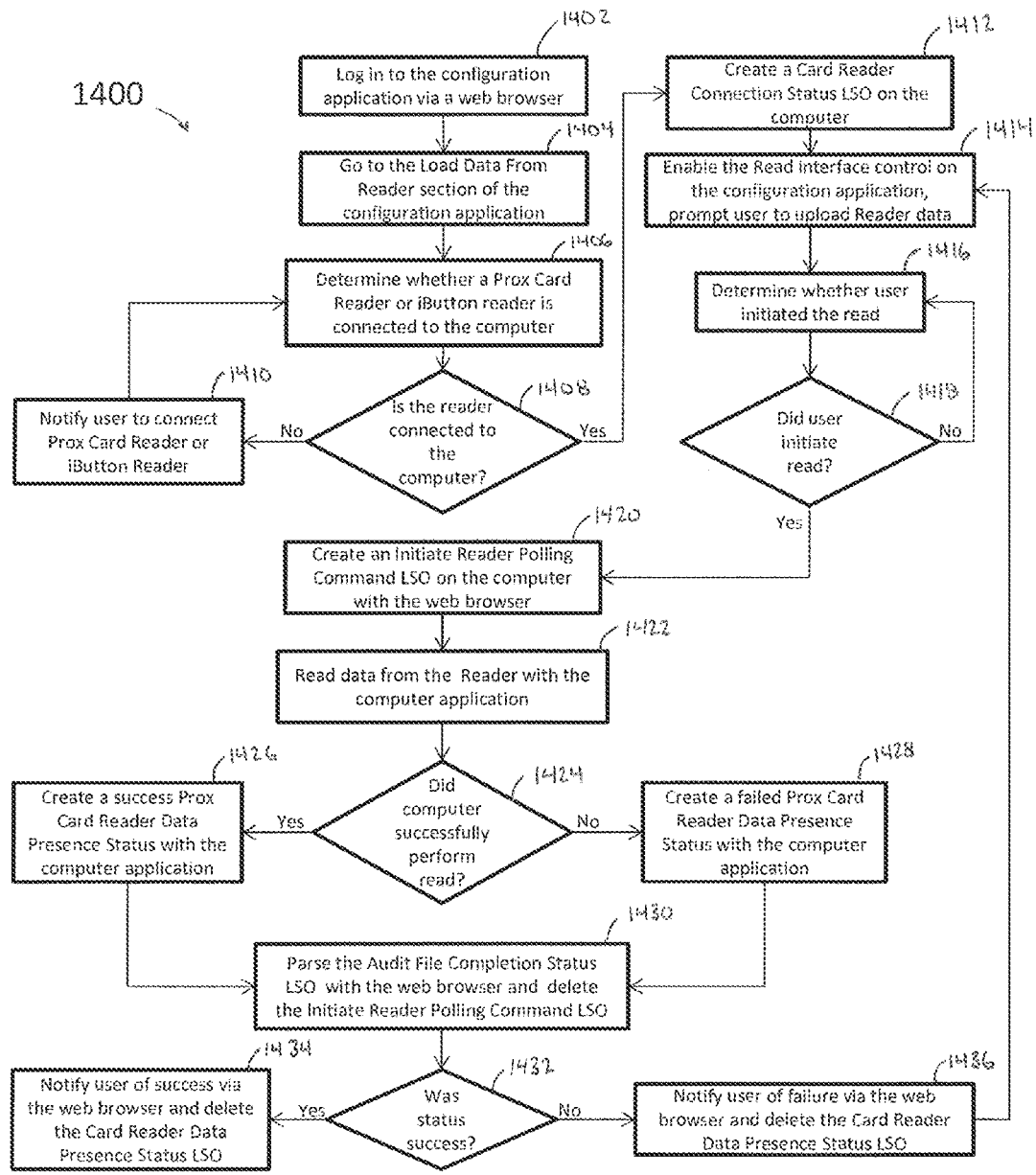
FIG. 14 is a schematic block diagram of an exemplary technique for reading data from a card.

FIG. 14 illustrates a schematic block diagram of a technique 1400 for reading prox card data from a reader. In operation 1402, the user logs into the configuration application 142 via the web browser 130. The logged-in user may create a new Prox Card Credential for a person or edit an existing Prox Card Credential. In operation 1404, a page in the web browser 130 includes a button called 'Load Data From Reader' next to the "facility" and "hot stamp" form fields.

In operation 1406, the web browser 130 detects whether a card reader was detected and technique 1400 proceeds to conditional 1408. At conditional 1408, it is determined whether a card reader was detected. If conditional 1408 is negative, technique 1400 proceeds to operation 1410 where the button is disabled and the web page includes instructions: "Please connect your prox card reader to your PC.", before technique 1400 returns to operation 1406. If conditional 1408 is positive, technique 1400 proceeds to conditional 1412 where the Prox Card Reader Connection Status LSO 304 is created on the local computer 110 and further proceeds to operation 1414 where the button is enabled.

Technique 1400 continues at operation 1416 to determine whether the user clicked the 'Load Data From Reader' button before proceeding to conditional 1418 where it is determined if the user initiated the read. If conditional 1418 is negative, the user did not click the button, and technique 1400 may return to operation 1416 to continue to poll whether the user clicks the button. If conditional 1418 is positive, the user did initiate the read, technique 1400 proceeds to operation 1420, where the web browser 130 creates the Initiate Prox Reader Polling Command LSO 328. The web browser 130 also includes new instructions: "Tap the prox card to the reader."

In operation 1422, the computer application 120 detects the Initiate Prox Reader Polling Command LSO 328, reads it, determines that the type of command is 'polling' and that the device is 'prox'. In operation 1422, the computer application 120 reads data from the prox reader every second until a non-zero value is read or 30 seconds has passed.

Technique 1400 proceeds to conditional 1424 to determine whether the computer successfully performed the read. If conditional 1424 is positive, the prox data is non-zero and the computer application 120 creates the Prox Card Reader Data Presence Status LSO 318 that includes: result='success' in operation 1426. If conditional 1424 is negative, the prox reader timed out and the computer application 120 creates LSO 318 that includes: result='failure' and type='timeout' in operation 1428.

Technique 1400 continues at operation 1430 where the web browser 130 detects and reads the Prox Card Reader Data Presence Status LSO 318 and computer application 120 deletes the Initiate Prox Reader Polling Command LSO 328. Technique 1400 proceeds to conditional 1432 where it is determined whether the status was a success. If the status was a success, technique 1400 proceeds to operation 1434 where the web browser 130 inserts the prox card data into the relevant form fields on the page and then deletes the Prox Card Reader Data Presence Status LSO 318. In operation 1434, the user can then submit the "Credential" form with the data in the fields as if the data had been directly entered into the form. If the status was a failure, technique 1400 proceeds to operation 1436 where the web browser 130 displays the failure message before technique 1400 proceeds to operation 1414 to try again.

It is contemplated that iButton readers may be substituted for prox card readers in technique 1400 along with using LSOs 306 and 320 instead of LSOs 304 and 318, respectively. It is also contemplated that other types of proximity technologies such as NFC and Bluetooth may be used with or in place of prox.

Figure 15:
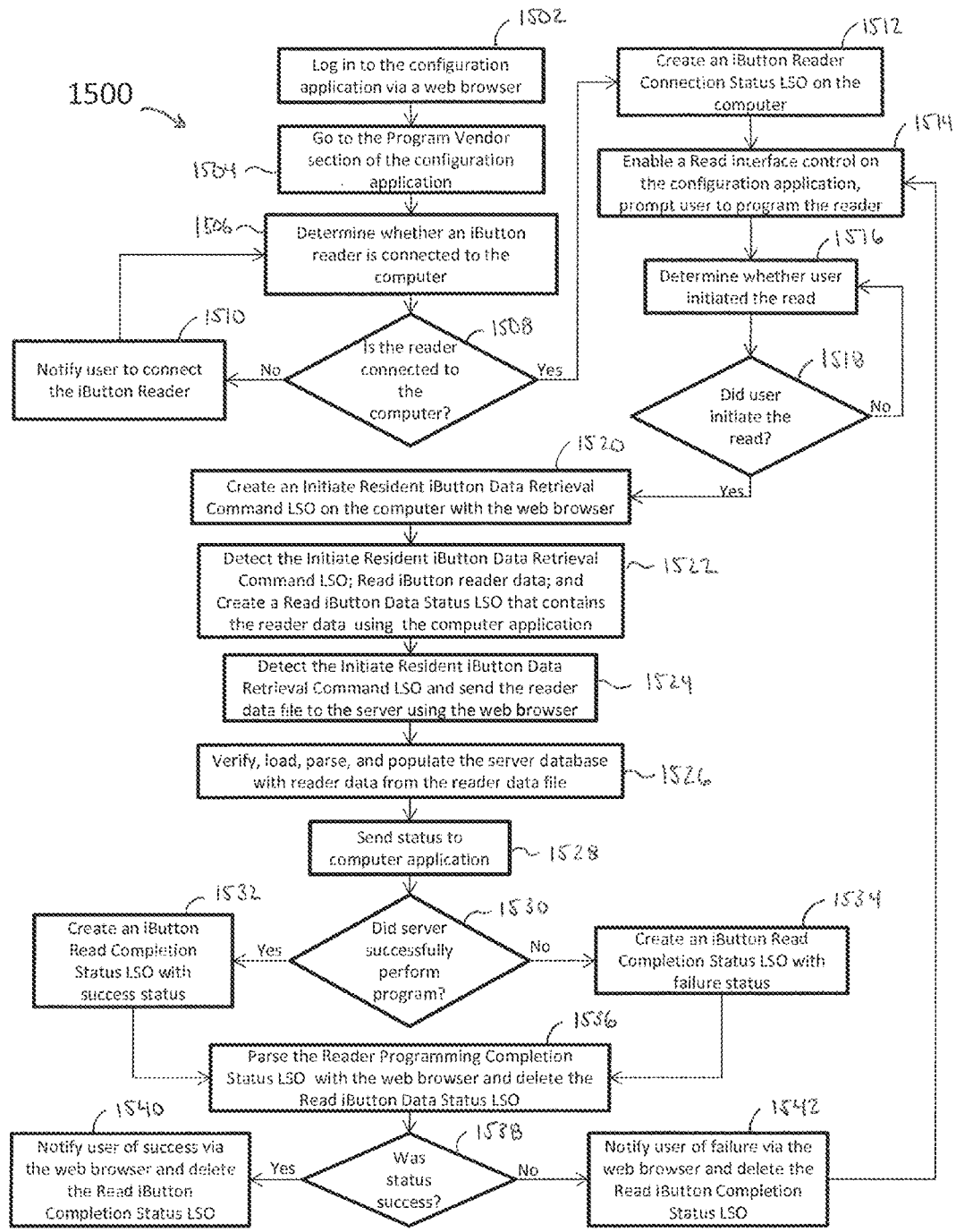
FIG. 15 is a schematic block diagram of an exemplary technique for reading and uploading data from an iButton.

FIG. 15 illustrates a schematic block diagram of a technique 1500 for reading data from a Resident iButton, packaging the data into a status LSO, and uploading the data to the server 140 using the web browser 130. In operation 1502, the user logs into the configuration application 142 via the web browser 130. In operation 1504, a page in the web browser 130 includes a button called 'Read iButton Data' on the "Job Activity" on the "Activity" page. This page in the web browser 130 may run JavaScript to detect the iButton Reader Connection Status LSO 306. If the LSO 306 is present on the local computer 110, technique 1500 jumps to operation 1514, discussed in further detail below.

In operation 1506, the web browser 130 detects whether an iButton reader was detected and technique 1500 proceeds to conditional 1508. At conditional 1508, it is determined whether the iButton reader was detected. If conditional 1508 is negative, technique 1500 proceeds to operation 1510 where the button is disabled before technique 1500 returns to operation 1506 to continue polling whether the iButton reader was detected. If conditional 1508 is positive, technique 1500 proceeds to conditional 1512 where the iButton Reader Connection Status LSO 306 is created on the local computer 110 and further proceeds to operation 1514 where the 'Upload Reader Data' button is enabled.

Technique 1500 continues at operation 1516 to determine whether the user clicked the 'Upload Reader Data' button before proceeding to conditional 1518 where it is determined if the user initiated the read. If conditional 1518 is negative, the user did not click the 'Upload Reader Data' button, and technique 1500 may return to operation 1516 to continue to poll whether the user has clicked the 'Upload Reader Data' button.

If it is determined the user did initiate the read at conditional 1518, technique 1500 proceeds to operation 1520, where the Initiate Resident iButton Data Retrieval Command LSO 330 is created by the web browser. In operation 1522, when the computer application detects Command LSO 330, the iButton reader data is read, and a pop-up modal window may appear showing the status indicating the status of the upload. Further, a Read iButton Data Status LSO 331 is created by the computer application 120 that includes the iButton data in a format the web browser 130 can interpret, such as in a JSON format, for example. The web browser 130 may also include instructions: "Press the orange iButton to the reader and hold it there."

In operation 1524, the web browser 130 extracts the data in the JSON format from the Status LSO 331 and sends the data in the JSON format to the server 140 via an asynchronous message, using Ajax, for example.

In operation 1526, the configuration application 142 on the server 140 receives the data in the JSON format and performs the following: verifies the request using the nonce value, loads and parses the data in the JSON format, populates the database 144 with the iButton data, and responds with either a success (status 200) or a failure (status 500) status in operation 1528.

Technique 1500 proceeds to conditional 1530 where the computer application 120 receives the response to the HTTPS POST, determines whether the server successfully sent the program task data, and the computer application 120 creates a Read iButton Completion Status LSO 332. If conditional 1528 is successful, the response is a success (status 200) and technique 1500 proceeds to operation 1532, where the Status LSO 332 includes: result='success'. If conditional 1528 is not successful, the response is a failure (status 500), the Status LSO 332 includes: result='failure' and type='upload' in operation 1534. It is contemplated that the server 140 may send the status to the web browser 130 rather than the computer application 120.

In operation 1536, the web browser 130 detects and reads, using JavaScript for example, the Read iButton Completion Status LSO 332. Technique 1500 proceeds to conditional 1538, where it is determined whether the status was successful. If conditional 1538 was successful, technique 1500 proceeds to operation 1540, where the web browser 130 shows: "Data from this iButton has been uploaded and the iButton has been erased." Operation 1738 then deletes the Read iButton Completion Status LSO 332. If conditional 1538 was not successful, technique 1500 proceeds to operation 1542, where the web browser 130 shows the failure message, the computer application 120 deletes the Status LSO 332, and technique 1500 returns to operation 1514.

Figure 16:
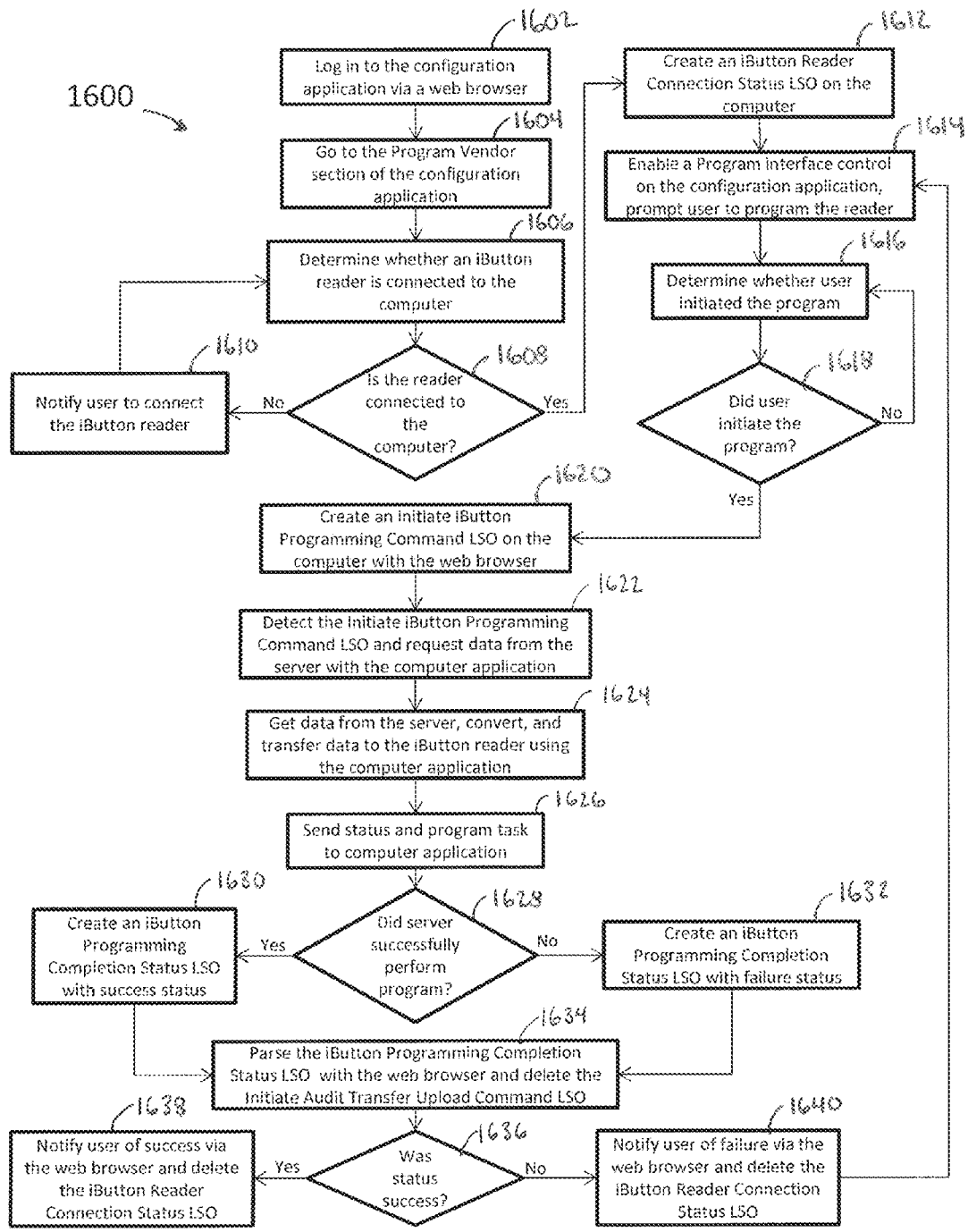
FIG. 16 is a schematic block diagram of an exemplary technique for programming an iButton.

FIG. 16 illustrates a schematic block diagram of a technique 1600 for programming a programmable iButton, such as a vendor iButton or a programmable resident iButton, for example. In operation 1602, the user logs into the configuration application 142 via the web browser 130. In operation 1604, a page in the web browser 130 includes a button called 'Program' on the Program Vendor page.

In operation 1606, the web browser 130 detects whether an iButton reader was detected and technique 1600 proceeds to conditional 1608. At conditional 1608, it is determined whether the iButton reader was detected. If conditional 1608 is negative, technique 1600 proceeds to operation 1610 where the 'Program' button is disabled and the web page includes instructions to connect the reader before technique 1600 returns to operation 1606. If conditional 1608 is positive, technique 1600 proceeds to conditional 1612 where the iButton Reader Connection Status LSO 306 is created on the local computer 110 and further proceeds to operation 1614 where the 'Program' button is enabled.

Technique 1600 continues at operation 1616 to determine whether the user clicked the 'Program' button before proceeding to conditional 1618 where it is determined if the user initiated the program. If conditional 1618 is negative, the user did not click the 'Program' button, and technique 1600 may return to operation 1616 to continue to poll whether the user has clicked the 'Program' button. If conditional 1618 is positive, the user did initiate the read, technique 1600 proceeds to operation 1620, where the web browser 130 creates the Initiate iButton Programming Command LSO 334.

If it is determined the user did initiate the program at conditional 1618, technique 1600 proceeds to operation 1620, where a pop-up modal window appears showing the status: "Starting iButton programming process . . . " The web browser 130 also includes new instructions: "Press the orange iButton to the reader and hold it there." Further in operation 1620, the JavaScript in the web browser 130 creates the Initiate iButton Programming Command LSO 334 that includes the URL for downloading the XML programming data via HTTPS GET.

In operation 1622, the computer application 120 detects the Command LSO 334, reads it, sees that it is of type 'program' and starts the programming process, wherein the computer application 120 initiates an HTTPS GET to the URL in the 'data' field of the LSO 334. In operation 1622 the server 140 uses the nonce value in the URL to verify the connection and generate the XML data of all the vendor access rights and sends the XML file, including a 200 OK Success response to the computer application 120, which converts the XML file into a set of iButton programming pages. Further in operation 1622, the computer application 120 transfers programming pages to the Vendor iButton.

Technique 1600 continues at conditional 1628, where it is determined whether the local computer successfully transferred the programming data to the Vendor iButton. If conditional 1628 is successful, technique 1600 proceeds to operation 1630, where the computer application 120 creates an iButton Programming Completion Status LSO 336 with result='success'. If conditional 1628 fails, technique 1600 proceeds to operation 1632 where the computer application 120 creates an iButton Programming Completion Status LSO 336 with result='failure'. The type of the failure depends upon where the failure happened: If the HTTPS GET returns a failure (401/500), the type is set to 'download'. If the conversion from XML to iButton programming pages fails, the type is set to 'conversion'. If the writing of iButton programming pages fails, the type is set to 'write'.

In operation 1634, the web browser 130 detects and reads, using JavaScript, for example, the iButton Programming Completion Status LSO 336. Technique 1600 proceeds to conditional 1636, where it is determined whether the status was successful. If conditional 1636 was successful, technique 1600 proceeds to operation 1638, where the web browser 130 shows: "iButton has been successfully programmed. You can now remove it from the reader." Operation 1638 then deletes the iButton Programming Completion Status LSO 336. If conditional 1636 was not successful, technique 1600 proceeds to operation 1640, where the web browser 130 shows the failure message, the computer application 120 deletes the Status LSO 336, and technique 1600 returns to operation 1614.

Figure 17:
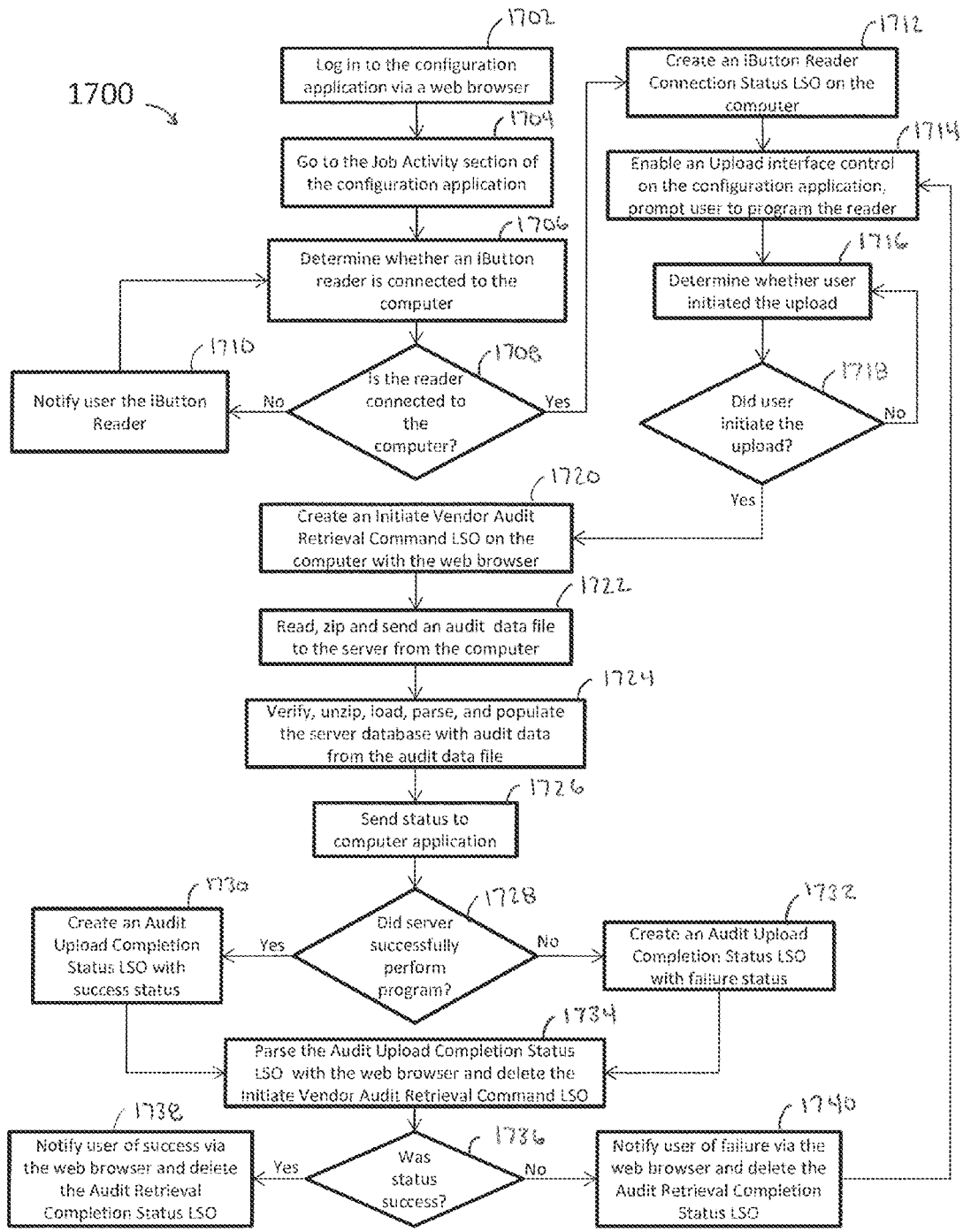
FIG. 17 is a schematic block diagram of an exemplary technique for uploading audit data from an iButton.

FIG. 17 illustrates a schematic block diagram of a technique 1700 for uploading audit data from an iButton reader. In operation 1702, the user logs into the configuration application 142 via the web browser 130. In operation 1704, a page in the web browser 130 includes a button called 'Upload Audit Data' on the "Job Activity" on the "Activity" page. This page in the web browser 130 may run JavaScript to detect the iButton Reader Connection Status LSO 306. If the LSO 306 is present on the local computer 110, technique 1700 jumps to operation 1714, discussed in further detail below.

In operation 1706, the web browser 130 detects whether an iButton reader was detected and technique 1700 proceeds to conditional 1708. At conditional 1708, it is determined whether the iButton reader was detected. If conditional 1708 is negative, technique 1700 proceeds to operation 1710 where the 'Upload Audit Data' button is disabled. If conditional 1708 is positive, technique 1700 proceeds to conditional 1712 where the iButton Reader Connection Status LSO 306 is created on the local computer 110 and further proceeds to operation 1714 where the 'Upload Audit Data' button is enabled.

Technique 1700 continues at operation 1716 to determine whether the user clicked the 'Upload Audit Data' button before proceeding to conditional 1718 where it is determined if the user initiated the upload. If conditional 1718 is negative, the user did not click the 'Upload Audit Data' button, and technique 1700 may return to operation 1716 to continue to poll whether the user has clicked the 'Upload Audit Data' button. If conditional 1718 is positive, the user did initiate the upload, technique 1700 proceeds to operation 1720, where the web browser 130 creates an Initiate Audit Retrieval Command 338.

If it is determined the user did initiate the program at conditional 1718, technique 1700 proceeds to operation 1720, where a pop-up modal window appears showing the status: "Starting vendor audit data upload . . . " The web browser 130 also includes new instructions: "Press the orange iButton to the reader and hold it there." In operation 1720, the JavaScript in the web browser 130 creates an Initiate Vendor Audit Retrieval Command LSO 338 that includes the URL for the upload HTTPS POST.

In operation 1722, the computer application 120 detects the Command LSO 338, reads it, sees that it is of type 'retrieval' and starts the upload process: The computer application 120 reads data from the iButton reader and zips the audit files into one or more ZIP files. The computer application 120 sends the ZIP file as an HTTPS POST upload to the URL in the 'data' field of the Command LSO 338.

In operation 1724, the configuration application 142 on the server 140 receives the HTTPS POST and performs the following: verifies the request using the nonce value, unpacks the ZIP file, loads and parses the one or more audit files, populates the database 144 with the audit data, and responds with either a success (status 200) or a failure (status 500) status in operation 1726.

Technique 1700 proceeds to conditional 1728 where the computer application 120 receives the response to the HTTPS POST, determines whether the server successfully sent the audit data, and the computer application 120 creates an Audit Retrieval Completion Status LSO 340. If conditional 1728 is successful, the response is a success (status 200) and technique 1700 proceeds to operation 1730 where the Status LSO 340 includes: result='success'. If conditional 1728 is not successful, the response is a failure (status 500), the Status LSO 340 includes: result='failure' and type='upload' in operation 1732.

In operation 1734, the web browser 130 detects and reads, using JavaScript for example, the Audit Retrieval Completion Status LSO 340. Technique 1700 proceeds to conditional 1736, where it is determined whether the status was successful. If conditional 1736 was successful, technique 1700 proceeds to operation 1738, where the web browser 130 shows: "Audit data from this iButton has been uploaded and the iButton has been erased." Operation 1738 then deletes the Audit Retrieval Completion Status LSO 340. If conditional 1736 was not successful, technique 1700 proceeds to operation 1740, where the web browser 130 shows the failure message, the computer application 120 deletes the Status LSO 340, and technique 1700 returns to operation 1714.

The server 140, and in particular the configuration application 142, may provide commands or instructions to the web browser 130 to create, read, detect, modify, and/or delete an LSO 115 as described above with respect to techniques 900, 1000, 1100, 1200, 1300, 1400, 1500, 1600, and 1700.

In one aspect of the present application, a system, includes: a computer in communication with an asset at a facility, the computer configured with non-transitory computer executable instructions to receive information about the asset, the computer further configured with non-transitory computer executable instructions to utilize a local shared object, wherein the local shared object is structured to store the information about the asset; and a server in communication with the computer, the server configured with non-transitory computer executable instructions to receive the information about the asset via the local shared object.

Features of the aspect of the present application may include: wherein the server comprises a database, the database including a non-transitory computer readable medium configured to store at least a portion of the information about the asset; wherein the asset includes at least one of a door and a reader; wherein the computer is further configured with non-transitory computer executable instructions to program the asset; wherein the server is further configured with non-transitory computer executable instructions to issue a command to the computer, wherein the command instructs the computer to perform an action with the local shared object.

One aspect of the present application may include a method, comprising: detecting, with a first application running on a computing device, a status web cookie on the computing device; in response to detecting the status web cookie, generating a command web cookie with the web browser running on the computing device; detecting, with a second application running on the computing device, the command web cookie on the computing device; determining a command action to perform with the second application running on the computing device based on the command web cookie; and performing, with the second application running on the computing device, the command action, wherein the command action includes at least one of receiving access control information from a web portal on a server and transmitting access control information to the web portal on the server.

Features of the aspect of the present application may include: wherein the status web cookie and the command web cookie are local shared objects; wherein the first application includes a web browser and the second application includes a service application running as a background process; wherein the status web cookie and the command web cookie are stored in a first file system location; generating, with the second application running on the computing device, a second status web cookie, wherein the second status web cookie indicates whether the command action was performed successfully; detecting, with the first application running on the computing device, the second status web cookie; and in response to detecting the second status web cookie, displaying with the first application whether the command action was performed successfully; wherein the status web cookie indicates a connection status of a handheld device and the command action includes receiving access control information from the web portal on the server; transmitting the access control information received from the web portal to the handheld device; and transmitting at least a portion of the access control information from the handheld device to one or more access control devices, wherein at least one of the access control devices includes an electronic lock; wherein the status web cookie indicates a presence of access control audit information on the computing device and the command action includes transmitting access control information from the computing device to the web portal on the server; wherein the access control information includes at least one of access control audit information and access control facility migration information; wherein the computing device and the server communicate via the Internet.

Another aspect of the present application may include an access control system, comprising: a computer configured to detect a presence of a status web cookie with a first application, generate a command web cookie with the first application, detect the command web cookie with a second application, determine a command action to perform with the second application based on the command web cookie, and perform the command action with the second application; and a server configured to host a web portal, transmit access control information to the computer, and receive access control information from the computer, wherein the command action includes at least one of receiving access control information from the web portal on the server and transmitting access control information to the web portal on the server.

Features of the aspect of the present application include: wherein the web portal includes a database configured to store the access control information, an access control configuration manager configured to communicate with the first application, and a lock configuration manager configured to communicate with the second application; wherein the computer and the server are configured to communicate via the Internet; wherein the status web cookie and the command web cookie are local shared objects; wherein the first application includes a web browser and the second application includes a background service application; wherein the status web cookie indicates a connection status of a handheld device and the command action includes a command to receive access control information from the web portal; wherein the status web cookie indicates a presence of access control audit information on the computing device and the command action includes a command to transmit access control information from the computing device to the web portal.

Yet another aspect of the present application includes an apparatus, comprising: a server including a web portal and a database associated with the web portal, wherein the server is configured to store instructions to be processed by a computer, transmit the instructions to the computer when requested by the computer, transmit access control information stored in the database to the computer, and receive access control information from the computer and store the access control information in the database, wherein when the instructions are processed by the computer, the instructions are structured to cause the computer to detect status local shared objects and generate command local shared objects.

Features of the aspect of the present application may include: wherein the server further includes an access control configuration manager configured to communicate with a first application on the computer, and a lock configuration manager configured to communicate with a second application on the computer; wherein the instructions are in JavaScript.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for operating an access control system structured to selectably control access to a physical location and including a server, a computing device, and credential reader, the method comprising:
   storing a status web cookie on a computing device, the status web cookie storing connection status information of the credential reader;
   detecting, with a web browser running on the computing device, the status web cookie on the computing device;
   generating a user interface with the web browser structured to request input from a user in response to detecting the status web cookie;
   generating a command web cookie with the web browser running on the computing device in response to the web browser receiving the input from the user;
   storing the command web cookie in memory on the computing device;
   generating a second status web cookie with a computer application running on the computing device in response to detecting the command web cookie, the second status web cookie providing both access control information polled from the credential reader and information for authentication by the server;
   detecting the second status web cookie with the web browser running on the computing device;
   providing to the server with the web browser the access control information polled from the credential reader and the information for authentication by the server in response to detecting the second status web cookie;
   receiving with the computer application running on the computing device a response form the server indicating authentication of the provided information and receipt of the polled information;
   deleting with the computer application running on the computing device the command web cookie in response to receiving the information.

2. The method of claim 1, wherein the status web cookie and the command web cookie are local shared objects.

3. The method of claim 1, wherein computer application includes a service application running as a background process.

4. The method of claim 1, wherein the status web cookie and the command web cookie are stored in a first file system location.

5. The method of claim 1, further comprising:
   generating, with the computer application running on the computing device, a third status web cookie, wherein the third status web cookie indicates whether the set of instructions was performed successfully;
   detecting, with the web browser running on the computing device, the third status web cookie; and
   in response to detecting the third status web cookie, displaying with the web browser whether the set of instructions were performed successfully.

6. The method of claim 1, wherein the status web cookie indicates a connection status of a handheld device.

7. The method of claim 6, further comprising:
   transmitting the access control information received from the web portal to the handheld device; and
   transmitting at least a portion of the access control information from the handheld device to one or more access control devices,
   wherein at least one of the access control devices includes an electronic lock.

8. The method of claim 1, wherein the status web cookie indicates a presence of access control audit information on the computing device and the set of instructions includes transmitting access control information from the computing device to the web portal on the server.

9. The method of claim 8, wherein the access control information includes at least one of access control audit information and access control facility migration information.

10. The method of claim 1, wherein the computing device and the server communicate via the Internet.

* * * * *